United States Patent
Cai et al.

(10) Patent No.: US 11,197,304 B2
(45) Date of Patent: Dec. 7, 2021

(54) RESOURCE INDICATION METHOD, COMMUNICATIONS APPARATUS, AND NETWORK DEVICE

(71) Applicant: HUAWEI TECHNOLOGIES CO., LTD., Shenzhen (CN)

(72) Inventors: Yu Cai, Beijing (CN); Da Wang, Shenzhen (CN); Yongbo Zeng, Beijing (CN); Jian Wang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/646,275

(22) PCT Filed: May 16, 2018

(86) PCT No.: PCT/CN2018/087185
§ 371 (c)(1),
(2) Date: Mar. 11, 2020

(87) PCT Pub. No.: WO2019/062151
PCT Pub. Date: Apr. 4, 2019

(65) Prior Publication Data
US 2020/0221471 A1 Jul. 9, 2020

(30) Foreign Application Priority Data

Sep. 30, 2017 (CN) .......................... 201710919666.0

(51) Int. Cl.
*H04W 4/00* (2018.01)
*H04W 72/12* (2009.01)
(52) U.S. Cl.
CPC .................................. *H04W 72/12* (2013.01)

(58) Field of Classification Search
CPC . H04W 76/00; H04W 72/04; H04W 72/0413; H04W 72/042; H04W 72/1278; H04W 4/30; H04L 5/0078; H04L 5/0082
See application file for complete search history.

(56) References Cited

U.S. PATENT DOCUMENTS

| 10,383,139 B2 * | 8/2019 | Ma ........................ H04L 1/1887 |
| 10,693,532 B2 * | 6/2020 | Kwon .................... H04L 5/0041 |

(Continued)

FOREIGN PATENT DOCUMENTS

| CA | 3012395 A1 | 8/2017 |
| CN | 103037517 A | 4/2013 |

(Continued)

OTHER PUBLICATIONS

R1-1713040 Qualcomm incorporated,"Sideiink resource allocation and configuration for bi-directional UE-to-NW relaying",3GPP TSG HAN WG1 Meeting #90,Prague, Czech Republic, May 21-25, 2017,total 4 pages.

(Continued)

*Primary Examiner* — Shantell L Heiber
(74) *Attorney, Agent, or Firm* — Rimon PC

(57) ABSTRACT

This application provides a method that includes the step of receiving, by a first device in a first time domain position, first scheduling information. The first scheduling information includes first indication information sent by a network device, wherein the first indication information is used to indicate a first interval. The method further comprises sending, by the first device, second scheduling information including second indication information to a second device in a second time domain position, wherein the second indication information is used to indicate a second interval, which is the difference between the first interval and a third interval. The second scheduling information is used by the second device to determine the target time domain position (Continued)

used by the second device to determine a time domain resource used to send and/or receive data.

4 Claims, 16 Drawing Sheets

(56) References Cited

U.S. PATENT DOCUMENTS

| | | | |
|---|---|---|---|
| 2014/0079408 A1* | 3/2014 | Yan | H04L 25/03006 |
| | | | 398/152 |
| 2015/0201432 A1* | 7/2015 | Rong | H04L 5/0007 |
| | | | 370/330 |
| 2016/0135171 A1 | 5/2016 | Korhonen et al. | |
| 2017/0012753 A1 | 1/2017 | Kim et al. | |
| 2017/0230996 A1* | 8/2017 | Li | H04W 72/1294 |
| 2017/0257878 A1 | 9/2017 | Kazmi et al. | |
| 2018/0054800 A1* | 2/2018 | Yeo | H04W 72/08 |
| 2018/0176941 A1 | 6/2018 | Liu et al. | |
| 2018/0352562 A1* | 12/2018 | Frederiksen | H04W 72/1268 |
| 2020/0059923 A1 | 2/2020 | Lei et al. | |

FOREIGN PATENT DOCUMENTS

| | | |
|---|---|---|
| CN | 103517371 A | 1/2014 |
| CN | 105981454 A | 1/2015 |
| CN | 104519465 A | 4/2015 |
| CN | 105684325 A | 6/2016 |
| CN | 106162920 A | 11/2016 |
| CN | 107071916 A | 8/2017 |
| WO | 2009100764 A1 | 8/2009 |
| WO | 2016182601 A1 | 11/2016 |
| WO | 2017030520 A1 | 2/2017 |

OTHER PUBLICATIONS

Qualcomm Incorporated et al.,"3GPP TSG-RAN WG1 #78 Aug. 18, 2014,Dresden, Germany", R1-143678, total: 19pages.

* cited by examiner

RESOURCE INDICATION METHOD, COMMUNICATIONS APPARATUS, AND NETWORK DEVICE

CROSS-REFERENCE TO RELATED APPLICATIONS

This application is a national stage of International Application No. PCT/CN2018/087185, filed on May 16, 2018, which claims the benefit of priority from Chinese Application No. 201710919666.0, filed Sep. 30, 2017, the disclosures of which are incorporated herein by reference in their entirety.

TECHNICAL FIELD

This application relates to the field of mobile communications technologies, and in particular, to a resource indication method, a communications apparatus, and a network device.

BACKGROUND

In a device-to-device (D2D) communications technology based on a cellular network, terminal devices may be controlled by a cellular base station to directly perform D2D communication by multiplexing a cell resource. Because D2D communication shares a resource with communication of a cell user, spectrum utilization of the cellular network is improved.

A UE-to-network relay operation is included in the D2D communications technology. During the operation, a remote terminal device (remote UE) may be connected to a base station by using a relay terminal device (relay UE). In this way, the base station can send scheduling information to the remote UE by using the relay UE, so that after receiving the scheduling information, the remote UE sends and/or receives data based on the resource position indicated by the scheduling information. How the base station sends the scheduling information to the remote UE by using the relay UE is an issue to be resolved urgently at present.

SUMMARY

Embodiments of this application provide a resource indication method, a communications apparatus, and a network device, to implement a process of forwarding, by a first device, signaling for scheduling a second device by a network device.

According to a first aspect, an embodiment of this application provides a resource indication method. In the method, a first device receives, in a first time domain position, first scheduling information sent by a network device, where the first scheduling information includes first indication information, and the first indication information is used to indicate a first interval; and then sends second scheduling information to a second device in a second time domain position, where the second scheduling information includes second indication information, the second indication information is used to indicate a second interval, the second interval is a difference between the first interval and a third interval, the third interval is a difference between the second time domain position and the first time domain position, the second scheduling information is used by the second device to determine that a target time domain position is a sum of the second time domain position and the second interval, and the target time domain position is used by the second device to determine a time domain resource used to send and/or receive data.

In the foregoing technical method, the first device determines, based on the first scheduling information that is sent by the network device and that is received in the first time domain position, to send the second scheduling information to the second device in the second time domain position, so that after receiving the second scheduling information, the second device determines the target time domain position based on content in the second scheduling information and the second time domain position, and then determines, based on the target time domain position, a time domain position of a resource allocated by the network device to the second device. This can implement a process of forwarding, by the first device, signaling for scheduling the second device by the network device.

In a possible design, the third interval is predefined, or is configured by the network device, or is preconfigured, and the first device determines that the second time domain position is a sum of the first time domain position and the third interval.

In the foregoing technical solution, the first device may determine, based on the first time domain position and the preset third interval, the second time domain position in which the second scheduling information is sent.

According to a second aspect, an embodiment of this application provides a resource indication method. In the method, a first device receives, in a first time domain position, first scheduling information sent by a network device, where the first scheduling information includes first indication information, and the first indication information is used to indicate a first interval; then determines that a second time domain position is a sum of the first time domain position and a third interval, where the third interval is a difference between the first interval and a second interval, and the second interval is predefined, or is configured by the network device, or is preconfigured; and finally sends second scheduling information to a second device in the determined second time domain position, where the second scheduling information is used by the second device to determine that a target time domain position is a sum of the second time domain position and the second interval, and the target time domain position is used by the second device to determine a time domain resource used to send and/or receive data.

In the foregoing technical method, after receiving the first scheduling information, the first device first determines the second time domain position based on the first time domain position in which the first scheduling information is received and the preset third interval, and then sends the second scheduling information to the second device in the determined second time domain position, so that after receiving the second scheduling information, the second device determines the target time domain position based on the preset third interval and the second time domain position, and then determines, based on the target time domain position, a time domain position of a resource allocated by the network device to the second device. This can implement a process of forwarding, by the first device, signaling for scheduling the second device by the network device.

According to a third aspect, an embodiment of this application provides a resource indication method. In the method, a first device receives, in a first time domain position, first scheduling information sent by a network device, where the first scheduling information includes first indication information and second indication information, the first indication information is used to indicate a first interval, and the second indication information is used to indicate a second interval; and then determines that a second time domain position is a sum of the first time domain position and the first interval, and sends second scheduling information to a second device in the determined second time domain position, where the second scheduling information includes third indication information, the third indication information is used to indicate the second interval, the second scheduling information is used by the second device to determine that a target time domain position is a sum of the second time domain position and the second interval, and the target time domain position is used by the second device to determine a time domain resource used to send and/or receive data.

In the foregoing technical method, after receiving the first scheduling information, the first device first determines the second time domain position based on the first time domain position in which the first scheduling information is received and the first interval indicated in the first scheduling information; and then sends the second scheduling information to the second device in the determined second time domain position, and indicates, in the second scheduling information, the second interval in the first scheduling information, so that after receiving the second scheduling information, the second device determines the target time domain position based on the second interval and the second time domain position, and then determines, based on the target time domain position, a time domain position of a resource allocated by the network device to the second device. This can implement a process of forwarding, by the first device, signaling for scheduling the second device by the network device.

According to a fourth aspect, an embodiment of this application provides a resource indication method. In the method, a first device receives, in a first time domain position, first scheduling information sent by a network device, where the first scheduling information includes first indication information, and the first indication information is used to indicate a first interval; and then determines that a second time domain position is a sum of the first time domain position and the first interval, and sends second scheduling information to the second device in the determined second time domain position, where the second invoking information is used to by the second device to determine that a target time domain position is a sum of the second time domain position and a second interval, the target time domain position is used by the second device to determine a time domain resource used to send and/or receive data, and the second interval is predefined, or is configured by the network device, or is preconfigured.

In the foregoing technical method, after receiving the first scheduling information, the first device first determines the second time domain position based on the first time domain position in which the first scheduling information is received and the first interval indicated in the first scheduling information, and then sends the second scheduling information to the second device in the determined second time domain position, so that after receiving the second scheduling information, the second device determines the target time domain position based on the preset second interval and the second time domain position, and then determines, based on the target time domain position, a time domain position of a resource allocated by the network device to the second device. This can implement a process of forwarding, by the first device, signaling for scheduling the second device by the network device.

According to a fifth aspect, an embodiment of this application provides a resource indication method. In the method, a first device receives, in a first time domain position, first scheduling information sent by a network device, where the first scheduling information includes first indication information, and the first indication information is used to indicate a first interval; then determines that a second time domain position is a sum of the first time domain position and a second interval, where the second interval is predefined, or is configured by the network device, or is preconfigured; and finally sends second scheduling information to a second device in the determined second time domain position, where the second scheduling information includes second indication information, the second indication information is used to indicate the first interval, the second scheduling information is used by the second device to determine that a target time domain position is a sum of the second time domain position and the first interval, and the target time domain position is used by the second device to determine a time domain resource used to send and/or receive data.

In the foregoing technical method, after receiving the first scheduling information, the first device first determines the second time domain position based on the first time domain position in which the first scheduling information is received and the preset second interval, and then sends the second scheduling information to the second device in the determined second time domain position and indicates the first interval in the second scheduling information, so that after receiving the second scheduling information, the second device determines the target time domain position based on the first interval and the second time domain position, and then determines, based on the target time domain position, a time domain position of a resource allocated by the network device to the second device. This can implement a process of forwarding, by the first device, signaling for scheduling the second device by the network device.

According to a sixth aspect, an embodiment of this application provides a resource indication method. In the method, a first device receives, in a first time domain position, first scheduling information sent by a network device, and then determines that a second time domain position is a sum of the first time domain position and a first interval, where the first interval is predefined, or is configured by the network device, or is preconfigured; and finally sends second scheduling information to the second device in the determined second time domain position, where the second invoking information is used by the second device to determine that a target time domain position is a sum of the second time domain position and a second interval, the target time domain position is used by the second device to determine a time domain resource used to send and/or receive data, and the second interval is predefined, or is configured by the network device, or is preconfigured.

In the foregoing technical method, after receiving the first scheduling information, the first device first determines the second time domain position based on the first time domain position in which the first scheduling information is received and the preset first interval, and then sends the second scheduling information to the second device in the determined second time domain position, so that after receiving the second scheduling information, the second device determines the target time domain position based on the preset second interval and the second time domain position, and then determines, based on the target time domain position, a time domain position of a resource allocated by the network device to the second device. This can implement a process of forwarding, by the first device, signaling for scheduling the second device by the network device.

According to a seventh aspect, an embodiment of this application provides a resource indication method. In the method, a first device receives, in a first time domain position, first scheduling information sent by a network device, and then sends second scheduling information to a second device in a second time domain position, where the second scheduling information includes first indication information, the first indication information is used to indicate a first interval, the first interval is a difference between the second time domain position and the first time domain position, the second scheduling information is used by the second device to determine that a target time domain position is a sum of the second time domain position and a second interval, the target time domain position is used by the second device to determine a time domain resource used to send and/or receive data, the second interval is a difference between a third interval and the first interval, and the third interval is predefined, or is configured by the network device, or is preconfigured.

In the foregoing technical method, after receiving the first scheduling information, the first device first determines the second time domain position based on the first time domain position in which the first scheduling information is received, and then sends the second scheduling information to the second device in the determined second time domain position and indicates the first interval in the second scheduling information, so that after receiving the second scheduling information, the second device determines the target time domain position based on the first interval, the second time domain position, and the preset third interval, and then determines, based on the target time domain position, a time domain position of a resource allocated by the network device to the second device. This can implement a process of forwarding, by the first device, signaling for scheduling the second device by the network device.

In a possible design, the first scheduling information includes second indication information, the second indication information is used to indicate the first interval, and the first device determines that the second time domain position is a sum of the first time domain position and the first interval.

According to an eighth aspect, a resource indication method is provided in an embodiment of this application. In the method, a network device determines a first time domain position and first scheduling information, and then sends the first scheduling information to a first device in the first time domain position, where the first scheduling information includes first indication information, the first indication information is used to indicate a first interval, the first scheduling information is used by the first device to determine to send second scheduling information to a second device in a second time domain position, the second scheduling information includes second indication information, the second indication information is used to indicate a second interval, the second interval is a difference between the first interval and a third interval, the third interval is a difference between the second time domain position and the first time domain position, the second scheduling information is used by the second device to determine that a target time domain position is a sum of the second time domain position and the second interval, and the target time domain position is used by the second device to determine a time domain resource used to send and/or receive data.

According to a ninth aspect, a resource indication method is provided in an embodiment of this application. In the method, a network device determines a first time domain position and first scheduling information, and then sends the first scheduling information to a first device in the first time domain position, where the first scheduling information includes first indication information, the first indication information is used to indicate a first interval, the first scheduling information is used by the first device to determine to send second scheduling information to a second device in the second time domain position, the second time domain position is a sum of the first time domain position and a third interval, the third interval is a difference between the first interval and a second interval, the second interval is predefined, or is configured by the network device, or is preconfigured, the second scheduling information is used by the second device to determine that a target time domain position is a sum of the second time domain position and the second interval, and the target time domain position is used by the second device to determine a time domain resource used to send and/or receive data.

According to a tenth aspect, a resource indication method is provided in an embodiment of this application. In the method, a network device determines a first time domain position and first scheduling information, and then sends the first scheduling information to a first device in the first time domain position, where the first scheduling information includes first indication information and second indication information, the first indication information is used to indicate a first interval, the second indication information is used to indicate a second interval, the first scheduling information is used by the first device to send second scheduling information to a second device in a second time domain position, the second time domain position is a sum of the first time domain position and the first interval, the second scheduling information includes third indication information, the third indication information is used to indicate the second interval, the second scheduling information is used by the second device to determine that a target time domain position is a sum of the second time domain position and the second interval, and the target time domain position is used by the second device to determine a time domain resource used to send and/or receive data.

According to an eleventh aspect, a resource indication method is provided in an embodiment of this application. In the method, a network device determines a first time domain position and first scheduling information, and then sends the first scheduling information to a first device in the first time domain position, where the first scheduling information includes first indication information, the first indication information is used to indicate a first interval, the first scheduling information is used by the first device to determine to send second scheduling information to a second device in a second time domain position, the second time domain position is a sum of the first time domain position and the first interval, the second invoking information is used by the second device to determine that a target time domain position is a sum of the second time domain position and the second interval, the target time domain position is used by the second device to determine a time domain resource used to send and/or receive data, and the second interval is predefined, or is configured by the network device, or is preconfigured.

According to a twelfth aspect, a resource indication method is provided in an embodiment of this application. In the method, a network device determines a first time domain position and first scheduling information, and then sends the first scheduling information to a first device in the first time domain position, where the first scheduling information includes first indication information, the first indication information is used to indicate a first interval, the first scheduling information is used by the first device to send second scheduling information to a second device in a second time domain position, the second time domain position is a sum of the first time domain position and a second interval, the second interval is predefined, or is configured by the network device, or is preconfigured, the second scheduling information includes second indication information, the second indication information is used to indicate the first interval, the second scheduling information is used by the second device to determine that a target time domain position is a sum of the second time domain position and the first interval, and the target time domain position is used by the second device to determine a time domain resource used to send and/or receive data.

According to a thirteenth aspect, a resource indication method is provided in an embodiment of this application. In the method, a network device determines a first time domain position and first scheduling information, and then sends the first scheduling information to a first device in the first time domain position, where the first scheduling information is used by the first device to send second scheduling information to the second device in a second time domain position, the second time domain position is a sum of the first time domain position and a first interval, the first interval is predefined, or is configured by the network device, or is preconfigured, the second invoking information is used by the second device to determine that a target time domain position is a sum of the second time domain position and a second interval, the target time domain position is used by the second device to determine a time domain resource used to send and/or receive data, and the second interval is predefined, or is configured by the network device, or is preconfigured.

According to a fourteenth aspect, a resource indication method is provided in an embodiment of this application. In the method, a network device determines a first time domain position and first scheduling information, and then sends the first scheduling information to a first device in the first time domain position, where the first scheduling information is used by the first device to determine to send second scheduling information to a second device in a second time domain position, the second scheduling information includes first indication information, the first indication information is used to indicate a first interval, the first interval is a difference between the second time domain position and the first time domain position, the second scheduling information is used by the second device to determine that a target time domain position is a sum of the second time domain position and a second interval, the target time domain position is used by the second device to determine a time domain resource used to send and/or receive data, the second interval is a difference between a third interval and the first interval, and the third interval is predefined, or is configured by the network device, or is preconfigured.

In a possible design, the first scheduling information includes second indication information, the second indication information is used to indicate the first interval, and the first interval is an interval between the first time domain position and the time domain position in which the first device sends the second scheduling information.

In the technical methods according to the eighth aspect to the fourteenth aspect, after determining the first time domain position and the first scheduling information, the network device sends the first scheduling information to the first device in the first time domain position, so that the first device sends the second scheduling information to the second device in the second time domain position after receiving the first scheduling information. In this way, after receiving the second scheduling information, the second device determines the target time domain position based on a time domain position in which the second scheduling information is received and/or the second scheduling information, and determines, based on the target time domain position, the time domain position of the resource allocated by the network device to the second device. This can implement a process of forwarding, by the first device, signaling for scheduling the second device by the network device.

According to a fifteenth aspect, an embodiment of this application provides a communications apparatus. The communications apparatus has a function of implementing actions of the first device in the methods according to the first aspect to the seventh aspect. The function may be implemented by hardware, or implemented by executing corresponding software by hardware. The hardware or the software includes one or more modules corresponding to the foregoing function.

In a possible design, a structure of the communications apparatus includes a processor and a transceiver. The processor is configured to support the communications apparatus to perform corresponding functions in the methods according to the first aspect to the seventh aspect. The transceiver is configured to: support communication between the communications apparatus and another device, and send, to the other device, information or an instruction in the methods according to the first aspect to the seventh aspect. The communications apparatus may further include a memory. The memory is configured to be coupled to the processor. The memory stores a necessary program instruction and necessary data.

According to a sixteenth aspect, an embodiment of this application provides a network device. The network device has a function of implementing actions of the network device in the methods according to the eighth aspect to the fourteenth aspect. The function may be implemented by hardware, or implemented by executing corresponding software by hardware. The hardware or the software includes one or more modules corresponding to the foregoing function.

In a possible design, a structure of the network device includes a processor and a transceiver. The processor is configured to support the network device to perform corresponding functions in the methods according to the eighth aspect to the fourteenth aspect. The transceiver is configured to: support communication between the network device and another device, and send, to the other device, information or an instruction in the methods according to the eighth aspect to the fourteenth aspect. The network device may further include a memory. The memory is configured to be coupled to the processor. The memory stores a necessary program instruction and necessary data.

According to a seventeenth aspect, an embodiment of this application provides a communications system. The communications system includes the communications apparatus according to any one of the first aspect to the seventh aspect and/or the network device according to any one of the eighth aspect to the fourteenth aspect.

According to an eighteenth aspect, an embodiment of this application provides a computer storage medium, configured to store a computer software instruction used to perform any one of the first aspect to the fourteenth aspect, or the designs of the first aspect to the fourteenth aspect, and the functions in the first aspect to the fourteenth aspect, and including a program designed for performing any one of the first aspect to the fourteenth aspect, or the designs of the first aspect to the fourteenth aspect, and the functions in the first aspect to the fourteenth aspect.

According to a nineteenth aspect, an embodiment of this application provides a computer program product. The computer program product includes an instruction, and when the instruction is run on a computer, the computer is enabled to perform any one of the first aspect to the fourteenth aspect, or the designs of the first aspect to the fourteenth aspect, and the methods according to the first aspect to the fourteenth aspect.

According to a twentieth aspect, an embodiment of this application further provides a chip system. The chip system includes a processor, configured to support a communications apparatus to implement the methods according to the first aspect to the seventh aspect, or configured to support a network device to implement the methods according to the eighth aspect to the fourteenth aspect, for example, to generate or process the data and/or information in the foregoing methods. In a possible design, the chip system further includes a memory, and the memory is configured to store a program instruction and data that are necessary for the communications apparatus or the network device. The chip system may include a chip, or may include a chip and another discrete device.

DESCRIPTION OF EMBODIMENTS

Figure 1:
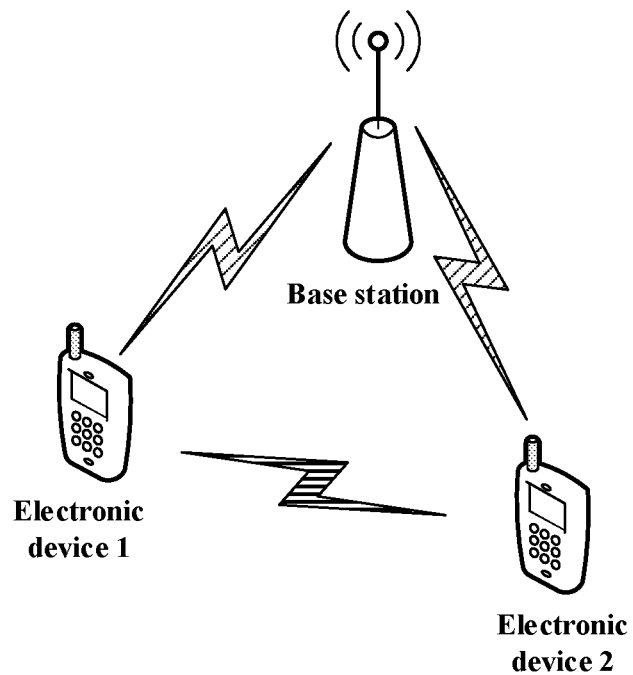
FIG. 1 is a schematic structural diagram of a communications system according to embodiments of this application.

To resolve the problem of how a base station sends scheduling information to remote UE using relay UE, the embodiments of this application provide a time domain resource indication method based on the communications system shown in FIG. 1. As shown in FIG. 1, the communications system includes at least a network device and two electronic devices. The two electronic devices in the communications system may be terminal devices that directly communicate with each other, and at least one of the two electronic devices may communicate with the network device, so that all other electronic devices in the communications system can communicate with the network device by using the electronic device. The electronic device that can communicate with the network device may be a relay node (RN), a base station, a terminal device, or the like, and another electronic device connected to the electronic device may be a terminal device or the like. For example, the two electronic devices that may directly communicate with each other may be two terminal devices used for D2D communication, and the terminal devices used for D2D communication may also perform cellular communication with the network device. It should be noted that the two terminal devices that may directly communicate with each other may alternatively be terminal devices that do not use a D2D communications technology. For example, the two terminal devices may be terminal devices using a Bluetooth or Wi-Fi technology, or may be terminal devices using another technology that belongs to future communications technologies and that may allow the terminal devices to directly communicate with each other. This is not limited in the embodiments of this application.

Certainly, the two electronic devices that may directly communicate with each other may alternatively be an RN and a terminal device, and the terminal device communicates with the network device by using the RN. Types of the two electronic devices in the communications system shown in FIG. 1 are not limited in the embodiments of this application. The following description is provided by using an example in which the two electronic devices in the communications system are terminal devices used for D2D communication. For example, the two electronic devices may be a terminal device 1 and a terminal device 2, and the terminal device 1 is connected to the network device by using the terminal device 2, or the terminal device 1 communicates with the network device by using the terminal device 2.

In the embodiments of this application, the communications system may be any radio access technology (RAT) system, such as a new radio (NR) system, wireless fidelity (Wi-Fi), worldwide interoperability for microwave access (WiMAX), a global system for mobile communications (GSM), a code division multiple access (CDMA) system, a wideband code division multiple access (WCDMA) system, a general packet radio service (GPRS), a long term evolution (LTE) system, an advanced long term evolution (LTE-A) system, a universal mobile telecommunications system (UMTS), and a cellular system related to the 3rd generation partnership project (3GPP), a 4th generation mobile communications technology (4G) network, or a 5th generation mobile communications technology (5G) network.

In addition, the method may further be applicable to a future-oriented communications technology. The system described in the embodiments of this application is intended to describe the technical solutions in the embodiments of this application more clearly, and constitute no limitation on the technical solutions provided in the embodiments of this application. A person of ordinary skill in the art may learn that, with evolution of network architectures, the technical solutions provided in the embodiments of this application are also applicable to a similar technical problem.

The network device in the embodiments of this application may be a base station (BS), a relay node (RN) device, or a device that is in an access network and that communicates with a wireless terminal device over an air interface by using one or more cells. The network device may be configured to perform mutual conversion between a received over-the-air frame and an IP packet and serve as a router between a terminal device and a rest part of the access network. The rest part of the access network may include an IP network. The network device may further coordinate attribute management of the air interface. If the network device is a base station, the base station may include an evolved NodeB (NodeB, Evolved Node B, or evolutional Node B) in a long term evolution (LTE) system or an evolved LTE system (LTE-Advanced, LTE-A), or may include a next generation NodeB gNB) in a 5G system. This is not limited in the embodiments of this application.

The terminal device in the embodiments of this application may include a device that provides a user with voice and/or data connectivity, for example, a handheld device with a wireless connection function, or a processing device connected to a wireless modem. The UE may communicate with a core network by using a radio access network (RAN), and exchange voice and/or data with the RAN. The terminal device may include user equipment (UE), a wireless terminal device, a mobile terminal device, a subscriber unit, a subscriber station, a mobile station, a mobile station, a remote station, an access point (AP), a remote terminal device, an access terminal device, a user terminal device, a user agent, a user device, and the like. For example, the terminal device may include a mobile phone (referred to as a "cellular" phone), a computer with a mobile terminal device, a portable, pocket-sized, handheld, computer-embedded, or in-vehicle mobile apparatus, a smart wearable device, and the like. For example, the terminal device may include a personal communication service (PCS) phone, a cordless telephone set, a session initiation protocol (SIP) phone set, a wireless local loop (WLL) station, a personal digital assistant (PDA), a smartwatch, a smart helmet, smart glasses, a smart band, and other devices. The terminal device further includes a restricted device, for example, a device with relatively low power consumption, a device with a limited storage capability, or a device with a limited computing capability. For example, the terminal device includes information sensing devices such as a barcode, radio frequency identification (RFID), a sensor, a global positioning system (GPS), and a laser scanner.

It should be noted that, a quantity and a type of network devices and terminal devices in the communications system shown in FIG. 1 are merely examples and are not limited in the embodiments of this application. For example, more network devices, more terminal devices that perform cellular communication with the network device, or more terminal devices that may directly communicate with each other, for example, more terminal devices that perform D2D communication, may further be included. For brevity of description, details are not described one by one in the accompanying drawings. In addition, in the communications system shown in FIG. 1, although the network device and the terminal devices are shown, the communications system may include but is not limited to the network device and the terminal devices. For example, the communications system may further include a core network device or a device configured to carry a virtualized network function. This is obvious to a person of ordinary skill in the art, and details are not described herein.

In addition, the terms "system" and "network" in the embodiments of this application may be used interchangeably. "Plurality" means two or more. In view of this, "plurality" may also be understood as "at least two" in the embodiments of the present invention. "And/or" describes an association relationship between associated objects and represents that three relationships may exist. For example, A and/or B may represent the following three cases: Only A exists, both A and B exist, and only B exists. In addition, the character "/", unless otherwise specified, generally indicates an "or" relationship between the associated objects.

In the prior art, in the communications system shown in FIG. 1, when the terminal device 1 needs to directly communicate with the terminal device 2, the network device may send downlink control information (DCI) to the terminal device 1 through a physical downlink control channel (PDCCH), to indicate a resource position in which the terminal device 1 directly communicates with the terminal device 2; and then, the terminal device 1 sends or receives data in the resource position indicated by the network device.

It can be learned from FIG. 1 that, there may be two communications links between the terminal device 1 and the network device. A first communications link is a link used when the terminal device 1 is directly connected to the network device, and is marked as L1; and a second communications link is a link used when the terminal device 1 is connected to the network device by using the terminal device 2, and is marked as L2. In this case, the terminal device 1 is referred to as remote UE, and the terminal device 2 is referred to as relay UE. The remote UE is connected to the network device by using the relay UE, the remote UE communicates with the network device by using the relay UE, data between the remote UE and the network device may be forwarded by the relay UE. The remote UE is linked to the relay UE, or the remote UE and the relay UE are associated. In this way, when the network device allocates a resource to the remote UE, for example, the network device allocates a sidelink (SL) resource between the remote UE and the relay UE to the remote UE, or the network device allocates an uplink (UL) resource to the remote UE, the network device can indicate the resource to the remote UE by using the relay UE. After receiving the indication information, the remote UE separately confirms a time domain resource position and a frequency domain resource position based on the indication information, to complete a resource allocation process.

In the prior art, when a network device allocates a resource, a method for directly indicating the resource by the network device is used. Such method often is not applicable to the case in which the network device indicates an allocated resource to remote UE by using relay UE. In view of this, the embodiments of this application provide a resource indication method. Resource positions usually include a time domain resource position and a frequency domain resource position. The embodiments of this application include only the case in which a network device indicates an allocated time domain resource to remote UE by using relay UE.

In the time domain resource indication method provided in the embodiments of this application, a first device determines, based on first scheduling information that is sent by a network device and that is received in a first time domain position, a second time domain position in which second scheduling information is sent to a second device or content of second scheduling information, so that after receiving the second scheduling information, the second device determines, based on the second scheduling information, a time domain position of a resource allocated by the network device to the second device. This can implement a process of forwarding, by the first device, signaling for scheduling the second device by the network device.

The following describes the technical solutions provided in the embodiments of this application with reference to the accompanying drawings. In the following description process, that the technical solutions provided in this application are applied to an application scenario shown in FIG. 1 is used as an example, and that the network device is the base station, and the first device is the terminal device 2, and the second device is the terminal device 1 is used as an example.

Figure 2:
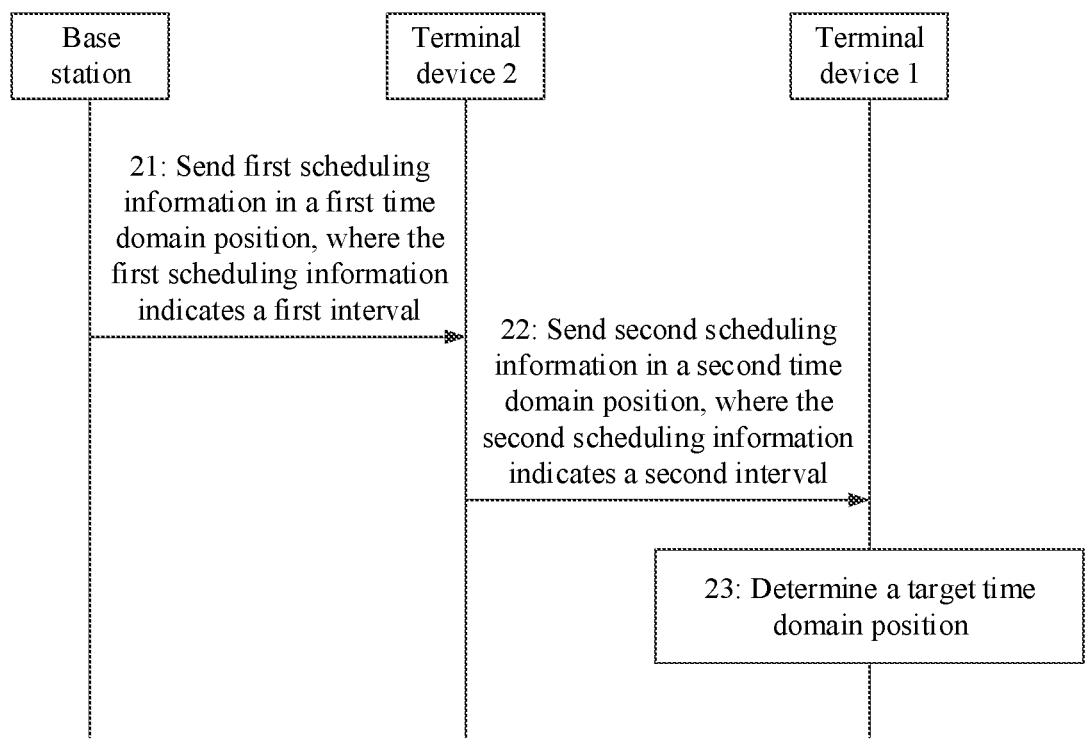
FIG. 2 is a flowchart of a time domain resource indication method according to an embodiment of this application.

FIG. 2 shows a time domain resource indication method according to an embodiment of this application. A process of the method is described as follows.

Step 21: A base station sends first scheduling information to a terminal device 2 in a first time domain position, where the first scheduling information includes first indication information, and the first indication information is used to indicate a first interval.

In a specific implementation process, the base station may feedback scheduling information to a terminal device 1 in the first time domain position after receiving, before the first time domain position, a resource request sent by the terminal device 1 or a resource request forwarded by the terminal device 2; or the base station proactively initiates, in the first time domain position, a service of allocating a time domain resource to the terminal device 1, and then allocates the resource to the terminal device 1 based on resource usage. The first time domain position may be a specific time point, for example, the $10^{th}$ second, or may be represented in a form of a time scheduling unit, for example, a time domain position of the $n^{th}$ time scheduling unit. In this embodiment of this application, the time scheduling unit may be any one of a frame, a subframe, a slot, a mini-slot (mini-slot), and an orthogonal frequency division multiplexing (OFDM) symbol. For unified description, in this embodiment of this application, each time domain position is represented in a form of a subframe. For example, the first time domain position is a subframe n. The base station receives, in the subframe n, the resource request sent by the terminal device 1, and in this case, determines, based on resource usage of a transmit link of the terminal device 1, a time domain position of the resource allocated to the terminal device 1. For example, the base station determines that all time domain resources corresponding to a subframe (n+1) to a subframe (n+T1−1) have been occupied, and there is an idle resource in a subframe (n+T1). In this case, the base station may allocate a time domain resource occupied by the subframe (n+T1) to the terminal device 1; may allocate time domain resources corresponding to the subframe (n+T1) to a subframe (n+T1+2) to the terminal device 1; or may allocate time domain resources corresponding to the subframe (n+T1), a subframe (n+T1+2), and a subframe (n+T1+4) to the terminal device 1. In this embodiment of this application, a time domain resource allocated by the base station to the terminal device 1 may be one subframe, a plurality of consecutive subframes, or a plurality of inconsecutive subframes. This is not limited herein.

After determining the time domain position of the resource allocated to the terminal device 1, the base station may determine the first interval based on the time domain position of the resource allocated to the terminal device 1 and the first time domain position. The first interval may be an interval between a target time domain position and the first time domain position, the target time domain position is used by the terminal device 1 or the terminal device 2 to determine the time domain position of the resource, and the target time domain position may be the same as or not exactly the same as the time domain position of the resource. A meaning of the first interval may specifically include the following cases:

In a first case, the resource may be a plurality of consecutive subframes, and the target time domain position may be a starting position of the time domain position of the resource. In this case, the first interval may be an interval between the starting time domain position of the resource and the first time domain position. For example, the first time domain position is the subframe n, and the base station determines that time domain resources allocated to the terminal device 1 are the subframe (n+T1) to the subframe (n+T1+2). In this case, an interval indicated by the first interval may be T1 subframes.

In a second case, the target time domain position may be the time domain position of the resource, or may be a position having a specific distance from the resource. For example, the resource is a subframe, and the target time domain position may be a corresponding position having a distance of N subframes before the subframe. In this case, the first interval may be a difference between the N subframes and an interval between the first time domain position and the time domain position of the resource. Certainly, the N subframes may be indicated in the first indication information, or pre-agreed on with the terminal device 1 and the terminal device 2.

In a third case, the target time domain position may be a specific position of the resource, for example, the target time domain position may be a midpoint position of the resource. In this case, the first interval is an interval between the midpoint position and the first time domain position. In this case, assuming that the first time domain position is the subframe n, and the base station determines that time domain resources allocated to the terminal device 1 are the subframe (n+T1) to the subframe (n+T1+2), the first interval may be (T1+1) subframes. In this case, an interval between the specific position of the resource and a starting position of the resource and an interval between the specific position of the resource and an ending position of the resource may be pre-agreed on between the base station, the terminal device 1, and, the terminal device 2. For example, it is pre-agreed that the specific position is the midpoint position of the resource, and both the interval between the specific position and the starting position and the interval between the specific position and the ending position of the resource are one subframe. In this way, after determining the specific position, the terminal device 1 considers by default that time domain resources occupied by a subframe that is immediately before the specific position to a subframe that is immediately after the specific position are time domain positions corresponding to the resource allocated by the base station to the terminal device 1.

In a fourth case, the target time domain position may be a starting position of a bitmap used for determining the time domain position of the resource allocated to the terminal device 1, so that the terminal device 1 or the terminal device 2 determines the time domain position of the resource based on the target position and the bitmap. For example, if the bitmap may be 10010, and the target time domain position is a subframe (n+i), it indicates that subframes in which the resource allocated by the base station to the terminal device 1 is located are the subframe (n+i) and a subframe (n+i+3). Certainly, the bitmap may be indicated in the first scheduling information, or may be pre-agreed on by the base station with the terminal device 1 and the terminal device 2.

In a specific implementation process, which one of the foregoing plurality of cases is included in the meaning of the first interval may be pre-agreed on between the base station, the terminal device 1, and the terminal device 2, or the meaning of the first interval may be added to the first scheduling information. For example, a specific bit is added to the first scheduling information, where values of the bit may be 0 to 5, and respectively correspond to the foregoing four cases. In this case, after receiving the first scheduling information, the terminal device 1 determines the meaning of the first interval based on the values of the specific bit. It should be noted that, a person skilled in the art may alternatively define the first interval in another manner. This is not limited in this embodiment of this application.

In the following description, that the first time domain position is the subframe n, the time domain position of the resource allocated by the base station to the terminal device 1 is the subframe (n+T1), and the first interval indicates the interval between the first time domain position and the time domain position of the resource is used as an example for description. In this case, the base station sends the first scheduling information to the terminal device 2 in the subframe n, and indicates the first interval by using the first scheduling information.

In this embodiment of this application, there are a plurality of manners of indicating, by the base station, the first interval by using the first scheduling information. Specifically, any one of the following three indication manners may be used:

(1) A value indicated by the first indication information is L1, the first interval T1 is indicated by using a value of L1, and the first interval T1 is a sum of L1 and a preset value k, where k is an integer greater than or equal to 0, and k is specified in a standard protocol used by the base station or a terminal, or k is configured by the base station based on resource usage in a current network or another factor, or k is preset by the network device before the network device communicates with the terminal device 1 or the terminal device 2.

(2) A value indicated by the first indication information is L1, and the first interval T1 indicated by using a value of L1 is a minimum value that meets the following two conditions: (1) T1 is greater than or equal to (L1+k) subframes, where k is an integer greater than or equal to 0, and k is specified in a standard protocol used by the base station or a terminal device, or k is configured by the base station based on resource usage in a current network or another factor, or k is preset by the network device before the network device communicates with the terminal device 1 or the terminal device 2; and (2) the subframe (n+T1) is a subframe in a preset subframe set, for example, the preset subframe set is an uplink subframe set in a subframe set for a physical sidelink shared channel (PSSCH) resource pool except a subframe used to transmit a sidelink synchronization sequence (SLSS) and a reserved subframe.

(3) A value indicated by the first indication information is L1, and the first interval T1 indicated by using a value of L1 is a minimum value that meets the following two conditions: (1) T1 is greater than or equal to (L1+k) subframes, where k is an integer greater than or equal to 0, and k is specified in a standard protocol used by the base station or the terminal device, or k is configured by the base station based on resource usage in a current network or another factor, or k is preset by the network device before the network device communicates with the terminal device 1 or the terminal device 2; and (2) the subframe (n+T1) is a subframe in a subframe set used by the terminal device 1 to send a PSSCH.

Similarly, another method for indicating the first interval by using the first indication information may alternatively be as follows: A value indicated by the first indication information is L1, and the first interval T1 indicated by using a value of L1 is a minimum value that meets both a condition that T1 is greater than or equal to (L1+k) subframes and another condition, where k is an integer greater than or equal to 0, and k is specified in a standard protocol used by the base station or a terminal, or k is configured by the base station based on resource usage in a current network or another factor, or k is preset by the network device before the network device communicates with the terminal device 1 or the terminal device 2.

Optionally, when a timing for sending or receiving data by the terminal device 1 is not synchronized with a timing for sending the first scheduling information by the base station, a subframe corresponding to the time domain position of the allocated resource is the $1^{st}$ subframe whose starting time is not earlier than {starting time of the subframe n+T1−time-domain length of a subframe−offset}. For example, the offset may be TA/2, TA is a timing advance of the terminal device 1, TA=$N_{TA}$×Ts, and Ts is a basic time unit in a frame structure and may be understood as a sampling time interval, where the value of Ts is specified in a standard, for example, Ts=1 ms/30720. $N_{TA}$ is configured by the base station. For another example, the offset may be TA/2+$N_{TA\ offset}$×Ts, where a value of $N_{TA\ offset}$ is specified in a standard.

In the following description, that the base station uses the first indication manner is used as an example for description. To be specific, the first indication information indicates L1, and L1+k=T1.

After determining that the resource allocated to the terminal device 1 is the subframe (n+T1) and determining that the first indication information indicates L1, the base station sends, to the terminal device 1, the first scheduling information including the first indication information. For example, the first scheduling information may be downlink control information (DCI) sent through a physical downlink control channel (PDCCH), or may be information sent through another physical downlink channel. This is not limited in this embodiment of this application.

Step 22: The terminal device 2 sends second scheduling information to the terminal device 1 in a second time domain position, where the second scheduling information includes second indication information.

After the base station sends the first scheduling information to the terminal device 2 in the first time domain position, the terminal device 2 receives the first scheduling information in the first time domain position.

In this embodiment of this application, when communicating with the base station, the terminal device 2 needs to obtain timing synchronization with the base station. Therefore, after the terminal device 2 obtains timing synchronization with the base station, the base station sends the first scheduling information in the first time domain position, to be specific, the subframe n. In this way, the terminal device 2 can determine that the terminal device 2 receives the first scheduling information in the first time domain position, to be specific, the subframe n.

In this embodiment of this application, the terminal device 2 may send the second scheduling information in the second time domain position in either of the following two manners.

Figure 3:
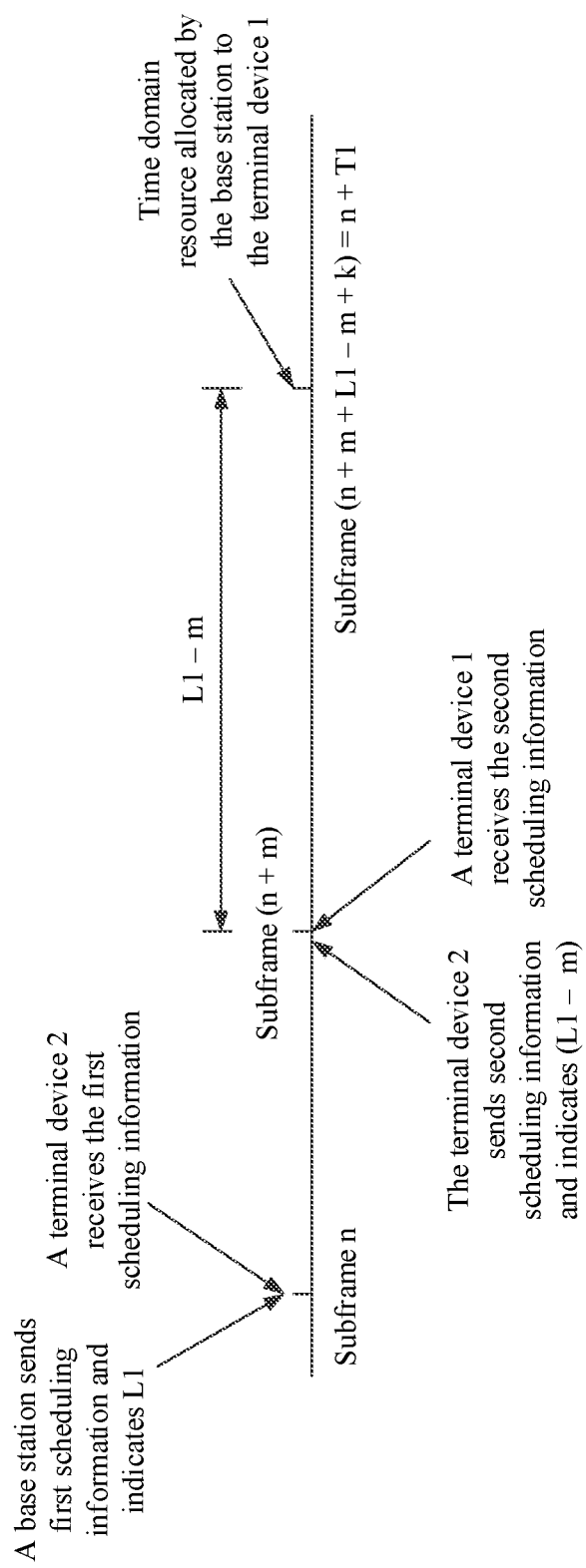
FIG. 3 is a schematic diagram of the time domain resource indication method shown in FIG. 2 in the embodiment of this application.

In a first sending manner, after receiving the first scheduling information in the first time domain position, the terminal device 2 determines the second time domain position based on the first time domain position and a known third interval. The third interval is specified in the standard protocol used by the terminal device, or is configured by the base station, or is preconfigured. Referring to FIG. 3, the terminal device 2 receives the first scheduling information in the subframe n, and the third interval is m subframes. In this case, the terminal device 2 determines that the second time domain position is a subframe (n+m). The terminal device 2 further needs to determine second indication information included in the second scheduling information. In this embodiment of this application, the second indication information is used to indicate a second interval, and the second interval is a difference between the first interval and the third interval. Specifically, the terminal device 2 receives the first scheduling information in the subframe n, and obtains that the value indicated by the first indication information in the first scheduling information is L1. In this case, the terminal device 2 determines, based on the preset value k, that the first interval indicated by the first indication information is the (L1+k) subframes, to determine that the second interval is (L1+k−m) subframes; and then indicates the second interval by using the second indication information.

Optionally, when a timing for sending the second scheduling information by the terminal device 2 is not synchronized with a timing for receiving the first scheduling information by the terminal device 2, a subframe corresponding to the second time domain position is the $1^{st}$ subframe whose starting time is not earlier than {starting time of the subframe n+third interval×time-domain length of a subframe−offset}. For example, the offset may be TA/2, TA is a timing advance of the terminal device 1, TA=$N_{TA}$×Ts, and Ts is a basic time unit in a frame structure and may be understood as a sampling time interval, where a value of Ts is specified in a standard, for example, Ts=1 ms/30720. $N_{TA}$ is configured by the base station. For another example, the offset may be TA/2+$N_{TA\ offset}$×Ts, where a value of $N_{TA\ offset}$ is specified in a standard.

In a second sending manner, after receiving the first scheduling information, the terminal device selects a time domain position after the first time domain position, to send the second scheduling information. The selected time domain position is the second time domain position. For example, the second time domain position is a subframe (n+m). Then, the terminal device 2 determines, based on the second time domain position, the second indication information included in the second scheduling information. The second indication information is used to indicate a second interval. The second interval is a difference between the first interval and a third interval, and the third interval is a difference between the second time domain position and the first time domain position. To be specific, the second interval is L1+k−m.

It should be noted that the terminal device 2 may indicate, in any one of the three indication manners of indicating by the base station the first interval by using the first indication information in step 21, the second interval by using the second indication information. Details are not described herein again. For example, the terminal device 2 may indicate, in the same manner as the manner of indicating by the base station, the first interval by using the first indication information in step 21, the second interval by using the second indication information. For example, the first indication manner is used in both the cases. The terminal device 2 may alternatively indicate, in a manner different from the manner of indicating by the base station, the first interval by using the first indication information in step 21, the second interval by using the second indication information. For example, the base station indicates, in the first indication manner, the first interval by using the first indication information, while the terminal device 2 indicates, in the second indication manner, the second interval by using the second indication information. The terminal device 2 may alternatively select any one of the manners depending on an actual case, to indicate the second interval. If selecting an indication manner depending on the actual case, the terminal device 2 needs to notify the terminal device 1 of the indication manner. A specific notification manner is not limited herein.

In the following description, that the terminal device 2 indicates, in the first indication manner in step 21, the second interval by using the second indication information is used as an example for description. If the terminal device 2 sends the second scheduling information in the first sending manner, the terminal device 2 determines that a value indicated by the second indication information is (L1−m).

After determining the second time domain position and the second scheduling information, the terminal device 2 sends the second scheduling information to the terminal device 1 in the second time domain position. For example, the second scheduling information may be sidelink control information (SCI) sent through a physical sidelink control channel (PSCCH), or may be information sent through another physical channel. This is not limited in this embodiment of this application.

Step 23: The terminal device 1 receives the second scheduling information and determines the target time domain position.

After the terminal device 2 sends the second scheduling information to the terminal device 1 in the second time domain position, the terminal device 1 receives the second scheduling information in the second time domain position.

In this embodiment of this application, when communicating with the terminal device 2, the terminal device 1 needs to obtain timing synchronization with the terminal device 2. Therefore, after the terminal device 1 obtains timing synchronization with the terminal device 2, the terminal device 2 sends the second scheduling information in the second time domain position, for example the subframe (n+m). In this way, the terminal device 1 can determine that the terminal device 1 receives the second scheduling information in the second time domain position, to be specific, the subframe (n+m).

After receiving the second scheduling information in the second time domain position, the terminal device 1 determines that the target time domain position is a time domain position corresponding to a sum of the second time domain position and the second interval indicated in the second scheduling information, to determine, based on the target time domain position, a time domain resource used by the terminal device 1 to send and/or receive data. It should be noted that, the terminal device 2 may indicate, in any one of the three indication manners of indicating by the base station, the first interval by using the first indication information in step 21, the second interval by using the second indication information. Details are not described herein again. A manner of determining, by the terminal device 1 based on the target time domain position, the time domain resource used to send and/or receive the data may be determined in the four cases in step 21 of the target time domain position and the time domain position of the resource.

Referring to FIG. 3, the terminal device 1 receives the second scheduling information in the subframe (n+m), and obtains that the value indicated in the second scheduling information is (L1−m), to indicate the second interval. In this embodiment of this application, the terminal device 1 can learn in advance the indication manner of indicating, by the terminal device 2, the second interval by using the second indication information. In other words, when the terminal device 2 indicates, in the first indication manner in step 21, the second interval by using the second indication information, the terminal device 1 can learn that the second interval is a sum of the value indicated in the second indication information and k in step 21. For example, the second scheduling information carries the manner of indicating the second interval by the second indication information, or the manner of indicating the second interval by the second indication information is pre-agreed on between the terminal device 1 and the terminal device 2. Certainly, there may alternatively be another manner. This is not limited herein. In this way, the terminal device 1 determines that the time domain position of the resource allocated to the terminal device 1 is the subframe (n+m+(L1−m+k)=n+L1+k=n+T1), and completes a process of indicating, by the base station to the terminal device 2 by using the terminal device 1, the time domain resource allocated to the terminal device 1.

Optionally, when a timing for sending or receiving data by the terminal device 1 is not synchronized with a timing for receiving the second scheduling information by the terminal device 1, a subframe corresponding to the target time domain position is the 1$^{st}$ subframe whose starting time is not earlier than {starting time of the subframe (n+m)+second interval×time-domain length of a subframe−offset}. For example, the offset may be TA/2, TA is a timing advance of the terminal device 1, TA=$N_{TA}$×Ts, and Ts is a basic time unit in a frame structure and may be understood as a sampling time interval, where a value of Ts is specified in a standard, for example, Ts=1 ms/30720. $N_{TA}$ is configured by the base station. For another example, the offset may be TA/2+$N_{TA\ offset}$×Ts, where a value of $N_{TA\ offset}$ is specified in a standard.

Figure 4:
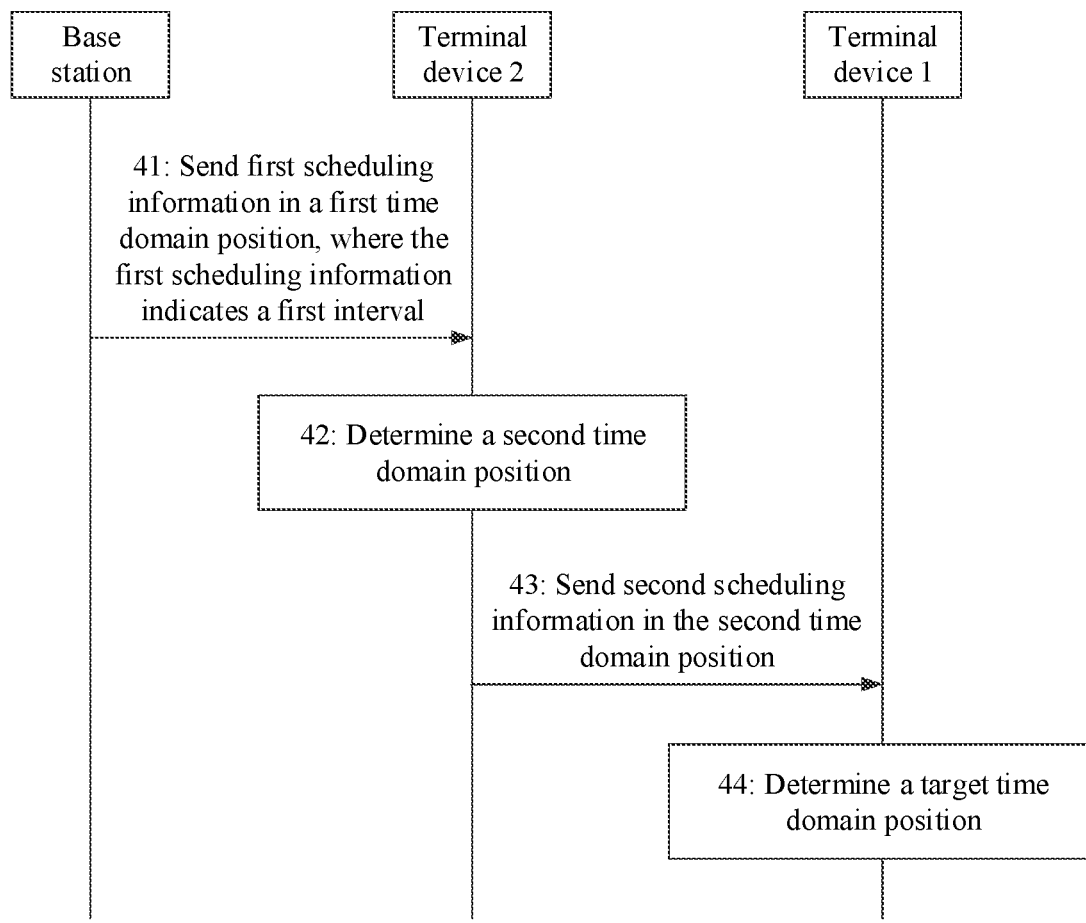
FIG. 4 is a flowchart of a time domain resource indication method according to another embodiment of this application.

FIG. 4 shows a resource indication method according to another embodiment of this application. A process of the method is as follows.

Step 41: A base station sends first scheduling information to a terminal device 2 in a first time domain position, where the first scheduling information includes first indication information, and the first indication information is used to indicate a first interval.

Figure 5:
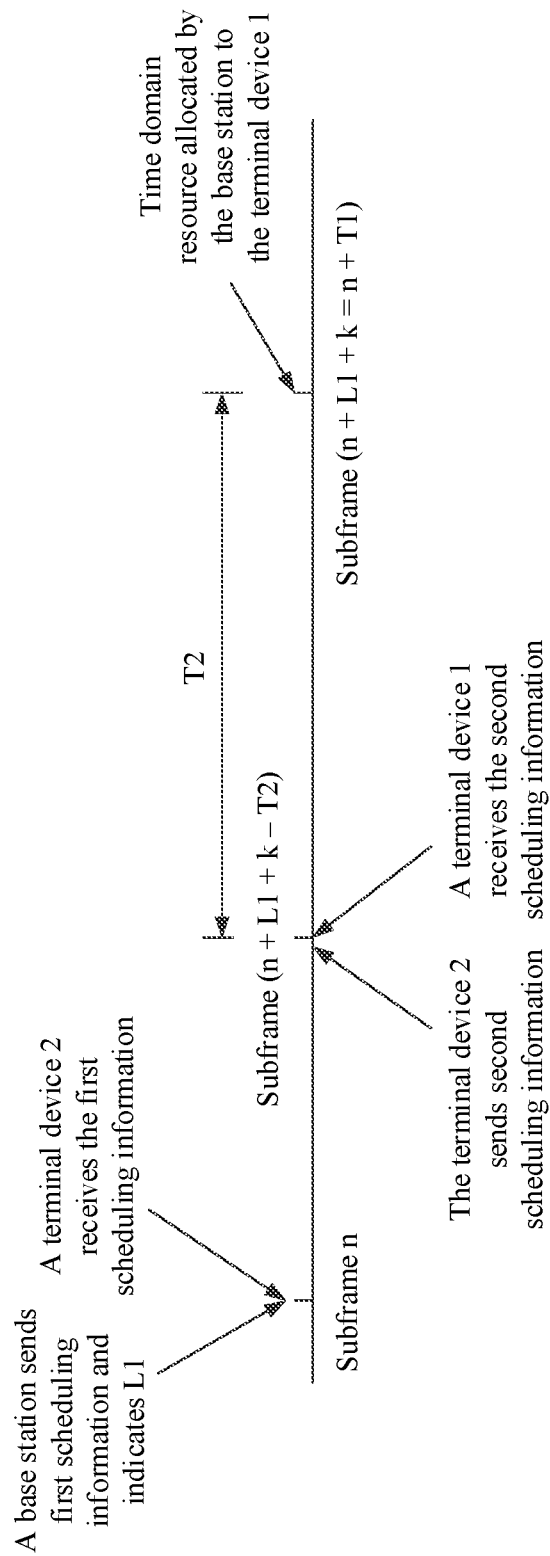
FIG. 5 is a schematic diagram of the time domain resource indication method shown in FIG. 4 in the embodiment of this application.

A specific implementation process of step 41 is the same as that of step 21, and details are not described herein again. In this embodiment of this application, that the first time domain position is a subframe n, the base station determines that a resource allocated to a terminal device 1 is a subframe (n+T1), and the base station indicates the first interval to the terminal device 2 in the first indication manner in step 21 and a value indicated by the first indication information is L1 is used as an example for description, as shown in FIG. 5.

Step 42: The terminal device 2 receives the first scheduling information and determines a second time domain position.

After the base station sends the first scheduling information to the terminal device 2 in the first time domain position, the terminal device 2 receives the first scheduling information in the first time domain position.

In this embodiment of this application, when communicating with the base station, the terminal device 2 needs to obtain timing synchronization with the base station. Therefore, after the terminal device 2 obtains timing synchronization with the base station, the base station sends the first scheduling information in the first time domain position, to be specific, the subframe n. In this way, the terminal device 2 can determine that the terminal device 2 receives the first scheduling information in the first time domain position, for example, the subframe n.

After receiving the first scheduling information in the first time domain position, the terminal device 2 determines the second time domain value based on the first time domain position. In this embodiment of this application, the second time domain position is a sum of the first time domain position and a third interval, and the third interval is a difference between the first interval and a second interval. The second interval is predefined, or is configured by the network device, or is preconfigured, and the second interval is learned in advance by both the terminal device 1 and the terminal device 2. Referring to FIG. 5, the terminal device 2 receives the first scheduling information in the subframe n, and obtains that the value indicated in the first indication information is L1. The terminal device 2 can learn in advance the indication manner of indicating by the base station, the first interval by using the first indication information. In other words, the terminal device 1 can learn that the first interval is a sum of the value indicated in the first indication information and a preset value k. For example, the first scheduling information carries the manner of indicating the first interval by the first indication information, or the manner of indicating the first interval by the first indication information is pre-agreed on between the base station and the terminal device 2. Certainly, there may alternatively be another manner. This is not limited herein. In this way, the terminal device 2 determines that the first interval is (L1+k) subframes. The terminal device then determines, based on the preset second interval, namely, T2 subframes, that the third interval is (L1+k−T2) subframes, and finally determines, based on a sum of the subframe n and the third interval, namely, (L1+k−T2) subframes, that the second time domain position is a subframe (n+L1+k−T2).

Optionally, when a timing for communicating with the terminal device 1 by the terminal device 2 is not synchronized with a timing for receiving the first scheduling information by the terminal device 2, a subframe corresponding to the second time domain position is the 1$^{st}$ subframe whose starting time is not earlier than {starting time of the subframe n+third interval×time-domain length of a subframe−offset}. For example, the offset may be TA/2, TA is a timing advance of the terminal device 2, TA=$N_{TA}$×Ts, and Ts is a basic time unit in a frame structure and may be understood as a sampling time interval, where a value of Ts is specified in a standard, for example, Ts=1 ms/30720. $N_{TA}$ is configured by the base station. For another example, the offset may be TA/2+$N_{TA\ offset}$×Ts, where a value of $N_{TA\ offset}$ is specified in a standard.

Step 43: The terminal device 2 sends second scheduling information to the terminal device 1 in the second time domain position.

In this embodiment of this application, the second scheduling information is used by the terminal device 1 to determine that a target time domain position is a sum of the second time domain position and the second interval, so as to determine, based on the target time domain position, a position of a time domain resource used to send and/or receive data. In this case, the second scheduling information does not include indication information used to indicate the time domain resource. It should be noted that, if the first scheduling information includes frequency domain position or other configuration information indicated to the terminal device 1, the second scheduling information may also include the frequency domain position or the other configuration information indicated in the first scheduling information. A type of the second scheduling information is the same as that in step 22, for example, may be the SCI, and details are not described herein again.

Step 44: The terminal device 1 receives the second scheduling information and determines the target time domain position.

After the terminal device 2 sends the second scheduling information to the terminal device 1 in the second time domain position, the terminal device 1 receives the second scheduling information in the second time domain position.

In this embodiment of this application, when communicating with the terminal device 2, the terminal device 1 needs to obtain timing synchronization with the terminal device 2. Therefore, after the terminal device 1 obtains timing synchronization with the terminal device 2, the terminal device 2 sends the second scheduling information in the second time domain position, for example the subframe (n+L1+k−T2). In this way, the terminal device 1 can determine that the terminal device 1 receives the second scheduling information in the second time domain position, e.g., the subframe (n+L1+k−T2).

After receiving the second scheduling information in the second time domain position, the terminal device 1 determines that the target time domain position is the sum of the second time domain position and the second interval. Referring to FIG. 5, after receiving the second scheduling information in the subframe (n+L1+k−T2), the terminal device 1 determines, based on the preset second interval T2, that the target time domain position is a subframe (n+L1+k−T2+T2=n+L1+k), to determine, based on the target time domain position, a time domain resource used by the terminal device 1 to send and/or receive data, and complete a process of indicating, by the base station to the terminal device 2 by using the terminal device 1, a time domain resource allocated to the terminal device 1. It should be noted that, a manner of determining, by the terminal device 1 based on the target time domain position, the time domain resource used to send and/or receive the data may be determined in the four cases in step 21 of the target time domain position and the time domain position of the resource. Details are not described herein again.

Optionally, when a timing for sending or receiving the data by the terminal device 1 is not synchronized with a timing for receiving the second scheduling information by the terminal device 1, a subframe corresponding to the target time domain position is the 1$^{st}$ subframe whose starting time is not earlier than {starting time of the subframe (n+m)+second interval×time-domain length of a subframe−offset}. For example, the offset may be TA/2, TA is a timing advance of the terminal device 1, TA=$N_{TA}$×Ts, and Ts is a basic time unit in a frame structure and may be understood as a sampling time interval, where a value of Ts is specified in a standard, for example, Ts=1 ms/30720. $N_{TA}$ is configured by the base station. For another example, the offset may be TA/2+$N_{TA\ offset}$×Ts, where a value of $N_{TA\ offset}$ is specified in a standard.

Figure 6:
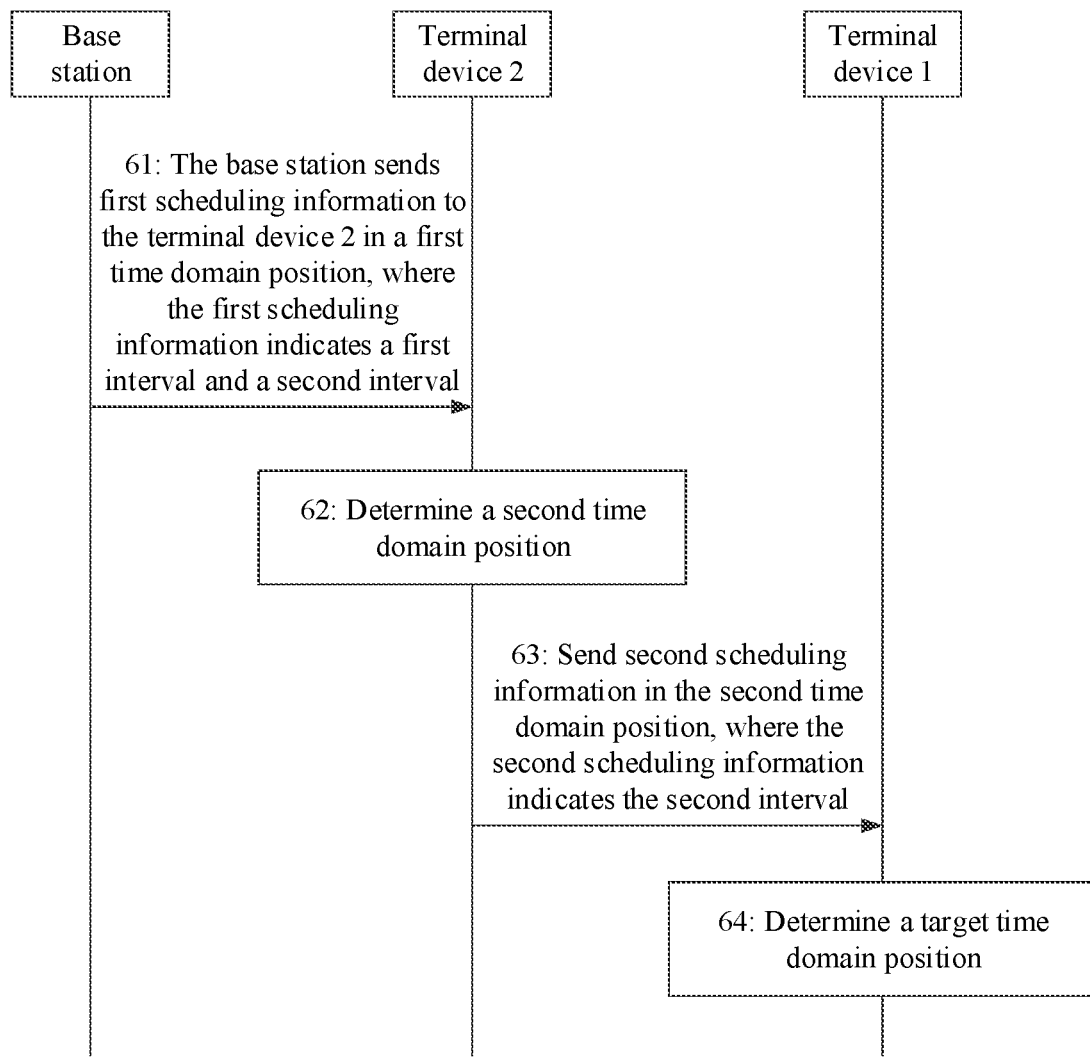
FIG. 6 is a flowchart of a time domain resource indication method according to another embodiment of this application.

FIG. 6 shows a resource indication method according to another embodiment of this application. A process of the method is as follows.

Step 61: A base station sends first scheduling information to a terminal device 2 in a first time domain position, where the first scheduling information includes first indication information and second indication information, the first indication information is used to indicate a first interval, and the second indication information is used to indicate a second interval.

In a specific implementation process, before sending the first scheduling information to the terminal device 2, the base station needs to determine a time domain position of a resource allocated to a terminal device 1. The process is the same as a corresponding process in step 21, and details are not described herein again. In the following description, that the first time domain position is a subframe n, the time domain position of the resource allocated by the base station to the terminal device 1 is a subframe (n+T1) is used as an example for description.

The base station further needs to determine a time domain position in which the terminal 2 sends second scheduling information, determines the first indication information based on the first time domain position and the time domain position in which the terminal 2 sends the second scheduling information, and determines the second indication information based on the time domain position in which the terminal 2 sends the second scheduling information and the time domain position of the resource allocated to the terminal device 1. The first interval included in the first indication information is used to indicate a difference between the time domain position in which the terminal device 2 sends the second scheduling information and the first time domain position, and the second interval included in the second indication information is used to indicate a difference between a target time domain position and the time domain position in which the terminal device 2 sends the second scheduling information. A sum of the first interval and the second interval is a difference between the target time domain position and the first time domain position. That is, the sum of the first interval and the second interval is T1.

Meanings of the first interval and the second interval, an indication manner of indicating the first interval by the first indication information, and an indication manner of indicating the second interval by the second indication information are similar to those in step 21. Details are not described herein again. In this embodiment of this application, that both the first interval and the second interval have the first meaning, and the first indication manner is used to indicate both the first interval by the first indication information and the second interval by the second indication information is used as an example. For example, a value indicated by the first indication information is L1, the first interval is (L1+k1) subframes, a value indicated by the second indication information is L2, and the second interval is (L2+k2) subframes. Using k1=k2=k as an example, L1+k1+L2+k2=T1, where k1 and k2 are respectively integers greater than or equal to 0, and are specified in a standard protocol used by the base station, or are configured by the base station based on resource usage in a current network or another factor, or are preset by the network device before the network device communicates with the terminal device 1 or the terminal device 2.

A type of the first scheduling information is the same as that in step 21, for example, the DCI, and details are not described herein again.

Step 62: The terminal device 2 receives the first scheduling information and determines a second time domain position.

After the base station sends the first scheduling information to the terminal device 2 in the first time domain position, the terminal device 2 receives the first scheduling information in the first time domain position.

In this embodiment of this application, when communicating with the base station, the terminal device 2 needs to obtain timing synchronization with the base station. Therefore, after the terminal device 2 obtains timing synchronization with the base station, the base station sends the first scheduling information in the first time domain position, to be specific, the subframe n. In this way, the terminal device 2 can determine that the terminal device 2 receives the first scheduling information in the first time domain position, to be specific, the subframe n.

Figure 7:
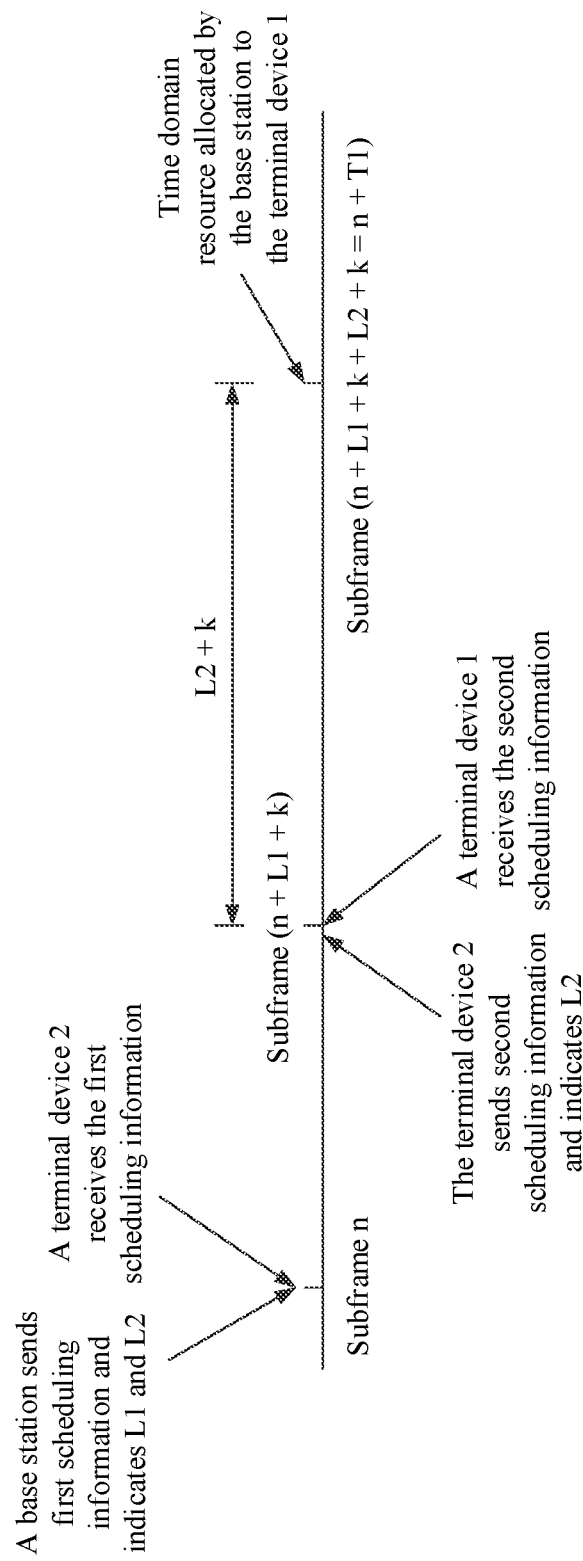
FIG. 7 is a schematic diagram of the time domain resource indication method shown in FIG. 6 in the embodiment of this application.

After receiving the first scheduling information in the first time domain position, the terminal device 2 determines that the second time domain position is a sum of the first time domain position and the first interval. The terminal device 2 can learn in advance an indication manner of indicating, by the base station, the first interval by using the first indication information. In other words, the terminal device 1 can learn that the first interval is a sum of the value indicated in the first indication information and a preset value k. For example, the first scheduling information carries the manner of indicating the first interval by the first indication information, or the manner of indicating the first interval by the first indication information is pre-agreed on between the base station and the terminal device 2. Certainly, there may alternatively be another manner. This is not limited herein. Therefore, the terminal device 2 determines that the second time domain position is a subframe (n+L1+k), as shown in FIG. 7.

Step 63: The terminal device 2 sends the second scheduling information to the terminal device 1 in the second time domain position, where the second scheduling information includes third indication information, and the third indication information is used to indicate the second interval.

In this embodiment of this application, the second scheduling information is used by the terminal device 1 to determine that the target time domain position is a sum of the second time domain position and the second interval, so as to determine, based on the target time domain position, a position of a time domain resource used to send and/or receive data.

The terminal device 2 may indicate, in any one of the three indication manners in step 21, the second interval by using the third indication information. Details are not described herein again. In this embodiment of this application, that the terminal device 2 uses the first indication manner is used as an example for description. For example, a value indicated by the third indication information is L2, indicating that the second interval is (L2+k) subframes.

It should be noted that, if the first scheduling information includes frequency domain position or other configuration information indicated to the terminal device 1, the second scheduling information may also include the frequency domain position or the other configuration information indicated in the first scheduling information. A type of the second scheduling information is the same as that in step 22, for example, may be the SCI, and details are not described herein again.

Optionally, when a timing for sending the second scheduling information by the terminal device 2 is not synchronized with a timing for receiving the first scheduling information by the terminal device 2, a subframe corresponding to the second time domain position is the $1^{st}$ subframe whose starting time is not earlier than {starting time of the subframe n+first interval×time-domain length of a subframe−offset}. For example, the offset may be TA/2, TA is a timing advance of the terminal device 1, TA=$N_{TA}$×Ts, and Ts is a basic time unit in a frame structure and may be understood as a sampling time interval, where a value of Ts is specified in a standard, for example, Ts=1 ms/30720. $N_{TA}$ is configured by the base station. For another example, the offset may be TA/2+$N_{TA\_offset}$×Ts, where a value of $N_{TA\_offset}$ is specified in a standard.

Step 64: The terminal device 1 receives the second scheduling information and determines the target time domain position.

After the terminal device 2 sends the second scheduling information to the terminal device 1 in the second time domain position, the terminal device 1 receives the second scheduling information in the second time domain position.

In this embodiment of this application, when communicating with the terminal device 2, the terminal device 1 needs to obtain timing synchronization with the terminal device 2. Therefore, after the terminal device 1 obtains timing synchronization with the terminal device 2, the terminal device 2 sends the second scheduling information in the second time domain position, to be specific, the subframe (n+L1+k). In this way, the terminal device 1 can determine that the terminal device 1 receives the second scheduling information in the second time domain position, for example, the subframe (n+L1+k).

After receiving the second scheduling information in the second time domain position, the terminal device 1 determines that the target time domain position is the sum of the second time domain position and the second interval. The terminal device 1 can learn in advance the indication manner of indicating, by the terminal device 1, the second interval by using the second indication information. In other words, when the terminal device 2 indicates, in the first indication manner in step 21, the second interval by using the third indication information, the terminal device 1 can learn that the second interval is a sum of the value indicated in the second indication information and k. For example, the first scheduling information carries the manner of indicating the first interval by the first indication information, or the manner of indicating the first interval by the first indication information is pre-agreed on between the base station and the terminal device 2. Certainly, there may be another manner. This is not limited herein. Referring to FIG. 7, after receiving the second scheduling information in the subframe (n+L1+k), the terminal device 1 determines, based on the value L2 indicated in the second scheduling information, that the target time domain position is a subframe (n+L1+k+L2+k=n+T1), to determine, based on the target time domain position, a time domain resource used by the terminal device 1 to send and/or receive data, and complete a process of indicating, by the base station to the terminal device 2 by using the terminal device 1, a time domain resource allocated to the terminal device 1. It should be noted that, a manner of determining by the terminal device 1 based on the target time domain position, the time domain resource used to send and/or receive the data may be determined in the four cases in step 21 of the target time domain position and the time domain position of the resource. Details are not described herein again.

Optionally, when a timing for sending or receiving the data by the terminal device 1 is not synchronized with a timing for receiving the second scheduling information by the terminal device 1, a subframe corresponding to the target time domain position is the $1^{st}$ subframe whose starting time is not earlier than {starting time of the subframe (n+m)+second interval×time-domain length of a subframe−offset}. For example, offset may be TA/2, TA is a timing advance of the terminal device 1, TA=$N_{TA}$×Ts, and Ts is a basic time unit in a frame structure and may be understood as a sampling time interval, where a value of Ts is specified in a standard, for example, Ts=1 ms/30720. $N_{TA}$ is configured by the base station. For another example, the offset may be TA/2+$N_{TA\ offset}$×Ts, where a value of $N_{TA\ offset}$ is specified in a standard.

Figure 8:
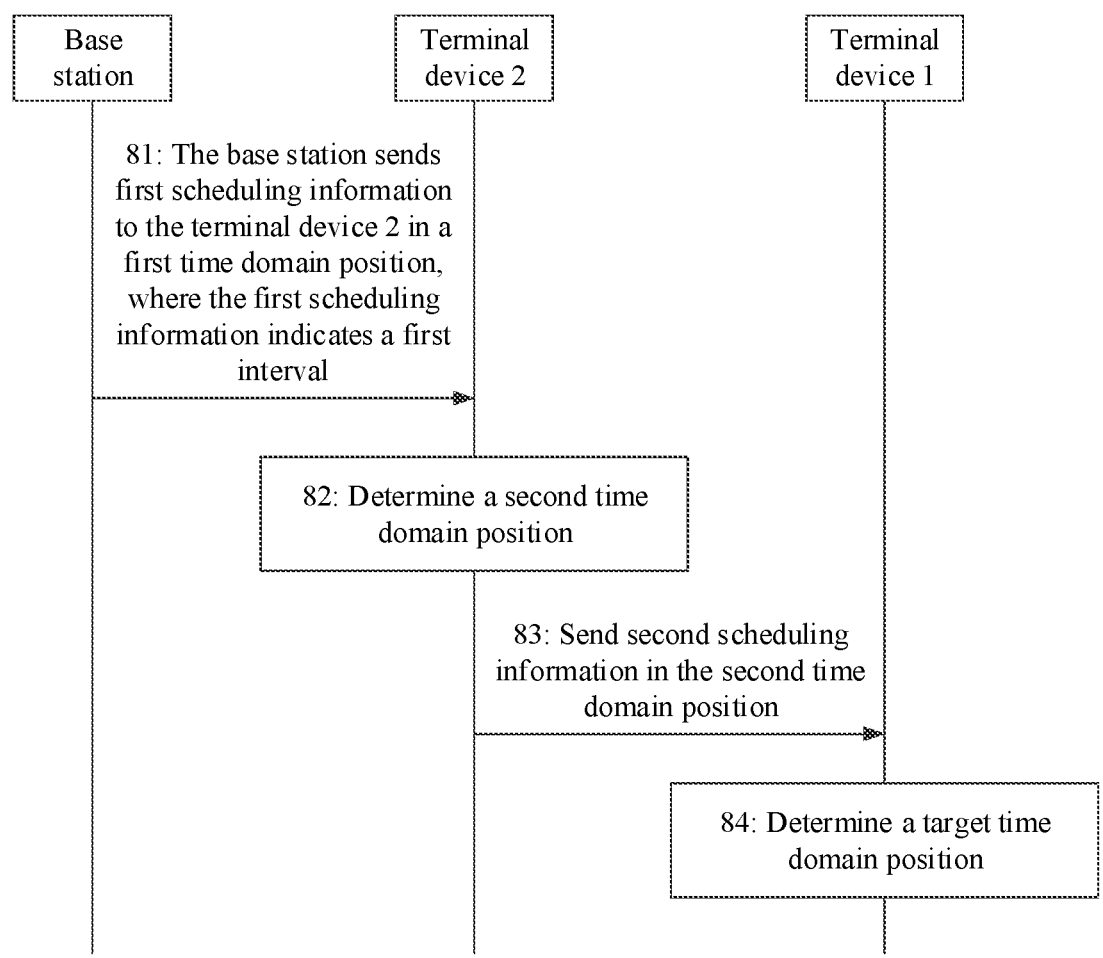
FIG. 8 is a flowchart of a time domain resource indication method according to another embodiment of this application.

FIG. 8 shows a resource indication method according to another embodiment of this application. A process of the method is as follows.

Step 81: A base station sends first scheduling information to a terminal device 2 in a first time domain position, where the first scheduling information includes first indication information, and the first indication information is used to indicate a first interval.

In a specific implementation process, before sending the first scheduling information to the terminal device 2, the base station needs to determine a time domain position of a resource allocated to a terminal device 1. The process is the same as a corresponding process in step 21, and details are not described herein again. In the following description, that the first time domain position is a subframe n, the time domain position of the resource allocated by the base station to the terminal device 1 is a subframe (n+T1) is used as an example for description.

The base station further needs to determine the first indication information. The first interval included in the first indication information is used to indicate a difference between the first time domain position and a time domain position in which the terminal device 2 sends second scheduling information. In this case, a second interval T2 is preset on the base station, the terminal device 1, and the terminal device 2, and the second interval is predefined, or is configured by the network device, or is preconfigured. In this way, the base station can determine that the first interval is a difference between a third interval and the second interval, and the third interval is a difference between a target time domain position and the first time domain position. To be specific, the first interval is (T1−T2).

A meaning of the first interval and an indication manner of indicating the first interval by the first indication information are similar to those in step 21. Details are not described herein again. In this embodiment of this application, that the first interval has the first meaning, and the first interval is indicated by the first indication information in the first indication manner is used as an example. For example, a value indicated by the first indication information is L1, the first interval is (L1+k) subframes, and L1+k=T1−T2, where k is an integer greater than or equal to 0, and k is specified in a standard protocol used by the base station, or k is configured by the base station based on resource usage in a current network or another factor, or k is preset by the network device before the network device communicates with the terminal device 1 or the terminal device 2.

A type of the first scheduling information is the same as that in step 21, for example, the DCI, and details are not described herein again.

Step 82: The terminal device 2 receives the first scheduling information and determines a second time domain position.

After the base station sends the first scheduling information to the terminal device 2 in the first time domain position, the terminal device 2 receives the first scheduling information in the first time domain position.

In this embodiment of this application, when communicating with the base station, the terminal device 2 needs to obtain timing synchronization with the base station. Therefore, after the terminal device 2 obtains timing synchronization with the base station, the base station sends the first scheduling information in the first time domain position, e.g., the subframe n. In this way, the terminal device 2 can determine that the terminal device 2 receives the first scheduling information in the first time domain position, e.g., the subframe n.

Figure 9:
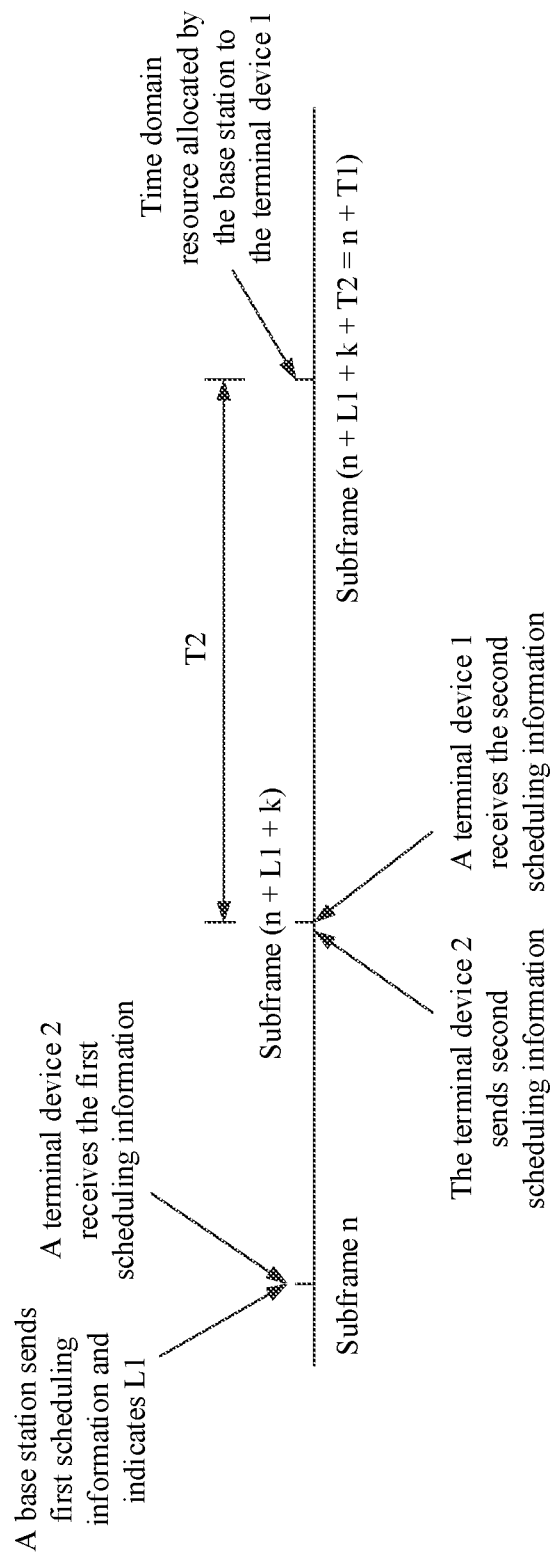
FIG. 9 is a schematic diagram of the time domain resource indication method shown in FIG. 8 in the embodiment of this application.

After receiving the first scheduling information in the first time domain position, the terminal device 2 determines that the second time domain position is a sum of the first time domain position and the first interval. The terminal device 2 can learn in advance the indication manner of indicating, by the base station, the first interval by using the first indication information. In other words, the terminal device 1 can learn that the first interval is a sum of the value indicated in the first indication information and a preset value k. For example, the first scheduling information carries the manner of indicating the first interval by the first indication information, or the manner of indicating the first interval by the first indication information is pre-agreed on between the base station and the terminal device 2. Certainly, there may alternatively be another manner. This is not limited herein. In this way, the terminal device 2 determines that the second time domain position is a subframe (n+L1+k), as shown in FIG. 9.

Step 83: The terminal device 2 sends second scheduling information to the terminal device 1 in the second time domain position.

In this embodiment of this application, the second scheduling information is used by the terminal device 1 to determine that the target time domain position is a sum of the second time domain position and the preset second interval, so as to determine, based on the target time domain position, a position of the time domain resource used to send and/or receive the data. In this case, the second scheduling information does not include indication information used to indicate the time domain resource. It should be noted that, if the first scheduling information includes frequency domain position or other configuration information indicated to the terminal device 1, the second scheduling information may also include the frequency domain position or the other configuration information indicated in the first scheduling information. A type of the second scheduling information is the same as that in step 22, for example, may be the SCI, and details are not described herein again.

Optionally, when a timing for sending the second scheduling information by the terminal device 2 is not synchronized with a timing for receiving the first scheduling information by the terminal device 2, a subframe corresponding to the second time domain position is the 1$^{st}$ subframe whose starting time is not earlier than {starting time of the subframe n+first interval×time-domain length of a subframe−offset}. For example, the offset may be TA/2, TA is a timing advance of the terminal device 1, TA=$N_{TA}$×Ts, and Ts is a basic time unit in a frame structure and may be understood as a sampling time interval, where a value of Ts is specified in a standard, for example, Ts=1 ms/30720. $N_{TA}$ is configured by the base station. For another example, the offset may be TA/2+$N_{TA\ offset}$×Ts, where a value of $N_{TA\ offset}$ is specified in a standard.

Step 84: The terminal device 1 receives the second scheduling information and determines the target time domain position.

After the terminal device 2 sends the second scheduling information to the terminal device 1 in the second time domain position, the terminal device 1 receives the second scheduling information in the second time domain position.

In this embodiment of this application, when communicating with the terminal device 2, the terminal device 1 needs to obtain timing synchronization with the terminal device 2. Therefore, after the terminal device 1 obtains timing synchronization with the terminal device 2, the terminal device 2 sends the second scheduling information in the second time domain position, to be specific, the subframe (n+L1+k). In this way, the terminal device 1 can determine that the terminal device 1 receives the second scheduling information in the second time domain position, to be specific, the subframe (n+L1+k).

After receiving the second scheduling information in the second time domain position, the terminal device 1 determines that the target time domain position is the sum of the second time domain position and the preset second interval. Referring to FIG. 9, after receiving the second scheduling information in the subframe (n+L1+k), the terminal device 1 determines, based on the value T2 of the preset second interval, that the target time domain position is a subframe (n+L1+k+T2=n+T1−T2+T2=n+T1), to determine, based on the target time domain position, the time domain resource used by the terminal device 1 to send and/or receive the data, and complete a process of indicating, by the base station to the terminal device 2 by using the terminal device 1, a time domain resource allocated to the terminal device 1.

It should be noted that, a manner of determining, by the terminal device 1 based on the target time domain position, the time domain resource used to send and/or receive the data may be determined in the four cases in step 21 of the target time domain position and the time domain position of the resource. Details are not described herein again.

Optionally, when a timing for sending or receiving the data by the terminal device 1 is not synchronized with a timing for receiving the second scheduling information by the terminal device 1, a subframe corresponding to the target time domain position is the 1$^{st}$ subframe whose starting time is not earlier than {starting time of the subframe (n+m)+second interval×time-domain length of a subframe−offset}. For example, the offset may be TA/2, TA is a timing advance of the terminal device 1, TA=$N_{TA}$×Ts, and Ts is a basic time unit in a frame structure and may be understood as a sampling time interval, where a value of Ts is specified in a standard, for example, Ts=1 ms/30720. $N_{TA}$ is configured by the base station. For another example, the offset may be TA/2+$N_{TA\ offset}$×Ts, where a value of $N_{TA\ offset}$ is specified in a standard.

Figure 10:
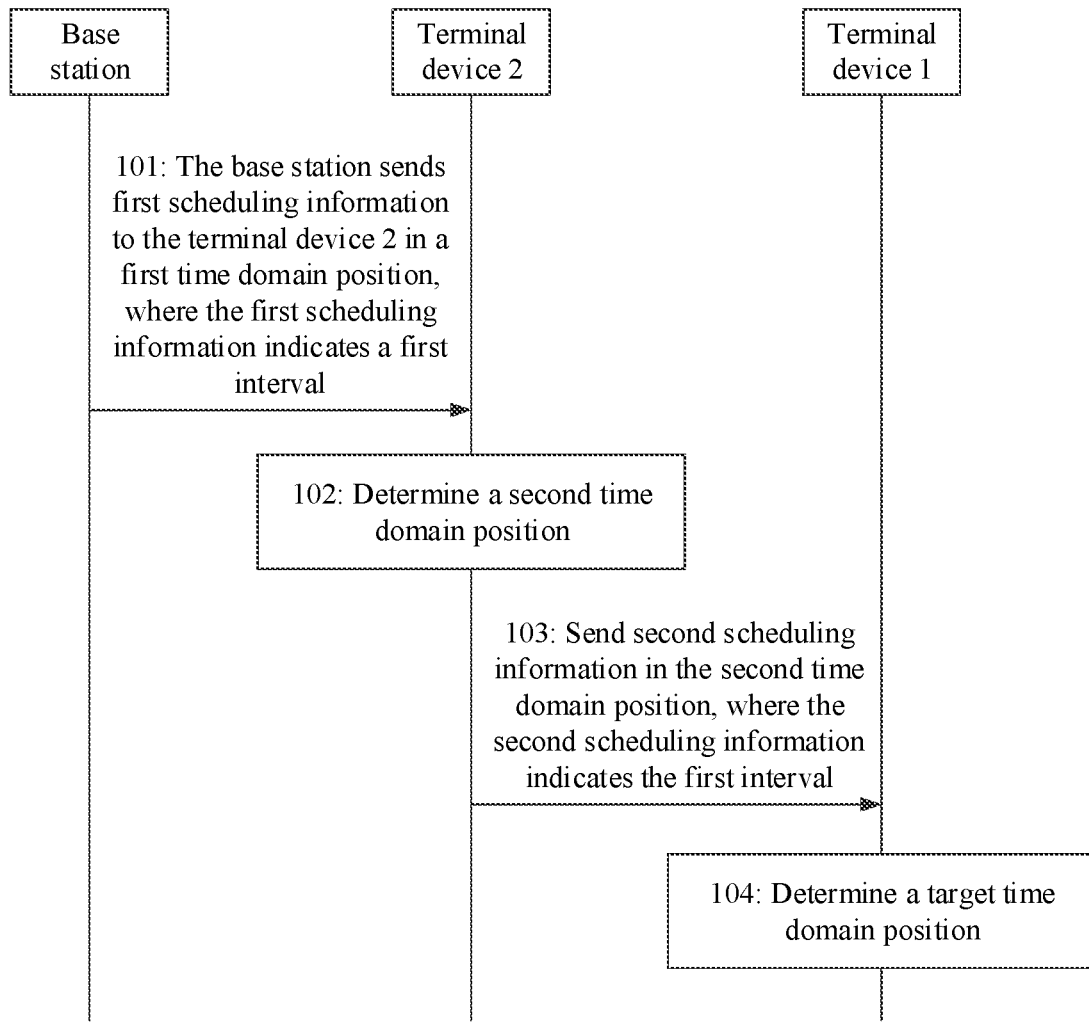
FIG. 10 is a flowchart of a time domain resource indication method according to another embodiment of this application.

FIG. 10 shows a resource indication method according to another embodiment of this application. A process of the method is as follows.

Step 101: A base station sends first scheduling information to a terminal device 2 in a first time domain position, where the first scheduling information includes first indication information, and the first indication information is used to indicate a first interval.

In a specific implementation process, before sending the first scheduling information to the terminal device 2, the base station needs to determine a time domain position of a resource allocated to a terminal device 1. The process is the same as a corresponding process in step 21, and details are not described herein again. In the following description, that the first time domain position is a subframe n, the time domain position of the resource allocated by the base station to the terminal device 1 is a subframe (n+T1) is used as an example for description.

The base station further needs to determine the first indication information. The first interval included in the first indication information is used to indicate a difference between a target time domain position and a time domain position in which the terminal device 2 sends second scheduling information. In this case, a second interval m is preset on the base station and the terminal device 2, and the second interval is predefined, or is configured by the network device, or is preconfigured. In this way, the base station can determine that the first interval is a difference between a third interval and the second interval, and the third interval is a difference between the target time domain position and the first time domain position. To be specific, the first interval is (T1−m).

A meaning of the first interval and an indication manner of indicating the first interval by the first indication information are similar to those in step 21. Details are not described herein again. In this embodiment of this application, that the first interval has the first meaning, and the indication manner of indicating the first interval by the first indication information is the first indication manner is used as an example. To be specific, a value indicated by the first indication information is L1, the first interval is (L1+k) subframes, and L1+k=T1−m, where k is an integer greater than or equal to 0, and k is specified in a standard protocol used by the base station, or k is configured by the base station based on resource usage in a current network or another factor, or k is preset by the network device before the network device communicates with the terminal device 1 or the terminal device 2.

A type of the first scheduling information is the same as that in step 21, for example, the DCI, and details are not described herein again.

Step 102: The terminal device 2 receives the first scheduling information and determines a second time domain position.

After the base station sends the first scheduling information to the terminal device 2 in the first time domain position, the terminal device 2 receives the first scheduling information in the first time domain position.

In this embodiment of this application, when communicating with the base station, the terminal device 2 needs to obtain timing synchronization with the base station. Therefore, after the terminal device 2 obtains timing synchronization with the base station, the base station sends the first scheduling information in the first time domain position, to be specific, the subframe n. In this way, the terminal device 2 can determine that the terminal device 2 receives the first scheduling information in the first time domain position, to be specific, the subframe n.

Figure 11:
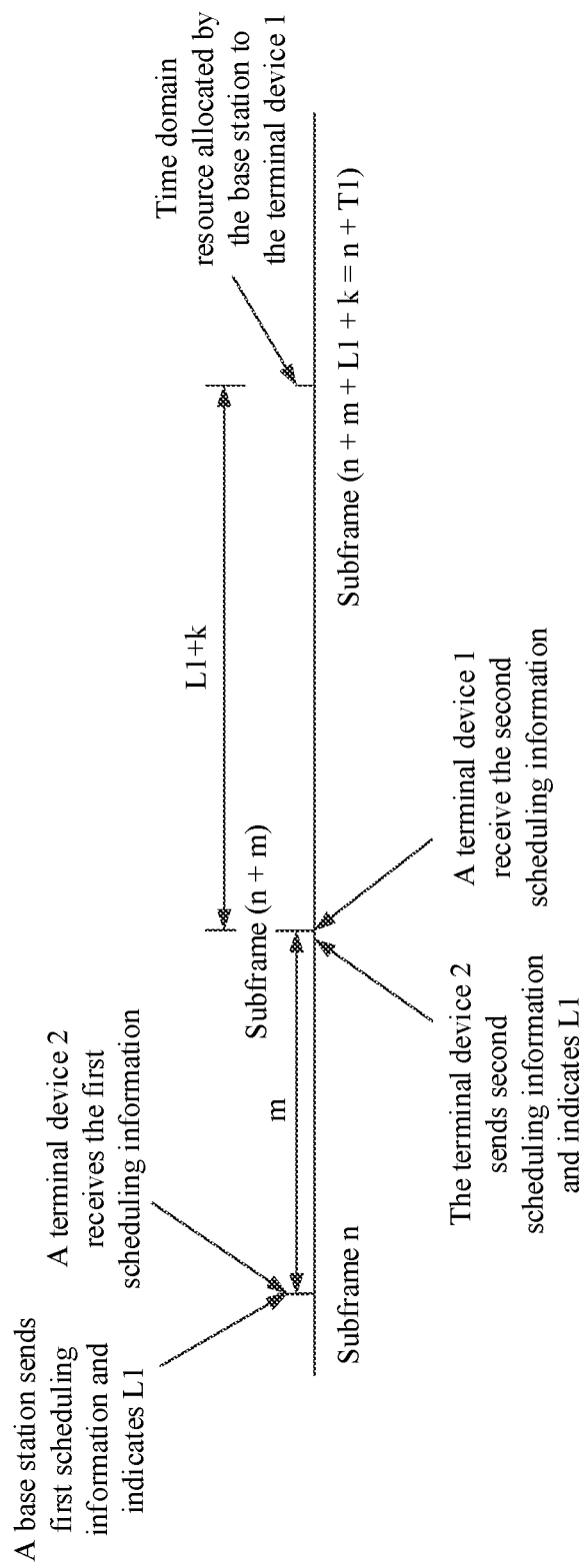
FIG. 11 is a schematic diagram of the time domain resource indication method shown in FIG. 10 in the embodiment of this application.

After receiving the first scheduling information in the first time domain position, the terminal device 2 determines that the second time domain position is a sum of the first time domain position and the preset second interval. For example, the second interval is m subframes. As shown in FIG. 11, the second time domain position is a subframe (n+m).

Step 103: The terminal device 2 sends the second scheduling information to the terminal device 1 in the second time domain position, where the second scheduling information includes second indication information, and the second indication information is used to indicate the first interval.

In this embodiment of this application, the second scheduling information is used by the terminal device 1 to determine that the target time domain position is a sum of the second time domain position and the first interval, so as to determine, based on the target time domain position, a position of a time domain resource used to send and/or receive data.

The terminal device 2 may indicate, in any one of the three indication manners in step 21, the first interval by using the second indication information. Details are not described herein again. In this embodiment of this application, that the terminal device 2 uses the first indication manner is used as an example for description. To be specific, a value indicated by the second indication information is L1, indicating that the first interval is (L1+k) subframes.

It should be noted that, if the first scheduling information includes frequency domain position or other configuration information indicated to the terminal device 1, the second scheduling information may also include the frequency domain position or the other configuration information indicated in the first scheduling information. A type of the second scheduling information is the same as that in step 22, for example, may be the SCI, and details are not described herein again.

Optionally, when a timing for sending the second scheduling information by the terminal device 2 is not synchronized with a timing for receiving the first scheduling information by the terminal device 2, a subframe corresponding to the second time domain position is the $1^{st}$ subframe whose starting time is not earlier than {starting time of the subframe n+second interval×time-domain length of a subframe−offset}. For example, the offset may be TA/2, TA is a timing advance of the terminal device 1, TA=$N_{TA}$×Ts, and Ts is a basic time unit in a frame structure and may be understood as a sampling time interval, where a value of Ts is specified in a standard, for example, Ts=1 ms/30720. $N_{TA}$ is configured by the base station. For another example, the offset may be TA/2+$N_{TA\ offset}$×Ts, where a value of $N_{TA\ offset}$ is specified in a standard.

Step 104: The terminal device 1 receives the second scheduling information and determines the target time domain position.

After the terminal device 2 sends the second scheduling information to the terminal device 1 in the second time domain position, the terminal device 1 receives the second scheduling information in the second time domain position.

In this embodiment of this application, when communicating with the terminal device 2, the terminal device 1 needs to obtain timing synchronization with the terminal device 2. Therefore, after the terminal device 1 obtains timing synchronization with the terminal device 2, the terminal device 2 sends the second scheduling information in the second time domain position, to be specific, the subframe (n+m). In this way, the terminal device 1 can determine that the terminal device 1 receives the second scheduling information in the second time domain position, to be specific, the subframe (n+m).

After receiving the second scheduling information in the second time domain position, the terminal device 1 determines that the target time domain position is the sum of the second time domain position and the first interval. Certainly, the terminal device 1 can learn in advance the indication manner of indicating, by the terminal device 1, the first interval by using the second indication information. To be specific, when the terminal device 2 indicates, in the first indication manner in step 21, the first interval by using the second indication information, the terminal device 1 can learn that the first interval is a sum of the value indicated in the second indication information and k. For example, the first scheduling information carries the manner of indicating the first interval by the first indication information, or the manner of indicating the first interval by the first indication information is pre-agreed on between the base station and the terminal device 2. Certainly, there may be another manner. This is not limited herein. Referring to FIG. 11, after receiving the second scheduling information in the subframe (n+m), the terminal device 1 determines, based on the value L1 indicated in the second scheduling information, that the target time domain position is a subframe (n+m+L1+k=n+m+T1−m=n+T1), to determine, based on the target time domain position, a time domain resource used by the terminal device 1 to send and/or receive data, and complete a process of indicating, by the base station to the terminal device 2 by using the terminal device 1, a time domain resource allocated to the terminal device 1.

It should be noted that, a manner of determining, by the terminal device 1 based on the target time domain position, the time domain resource used to send and/or receive the data may be determined in the four cases in step 21 of the target time domain position and the time domain position of the resource. Details are not described herein again.

Optionally, when a timing for sending or receiving the data by the terminal device 1 is not synchronized with a timing for receiving the second scheduling information by the terminal device 1, a subframe corresponding to the target time domain position is the $1^{st}$ subframe whose starting time is not earlier than {starting time of the subframe (n+m)+first interval×time-domain length of a subframe−offset}. For example, the offset may be TA/2, TA is a timing advance of the terminal device 1, TA=$N_{TA}$×Ts, and Ts is a basic time unit in a frame structure and may be understood as a sampling time interval, where a value of Ts is specified in a standard, for example, Ts=1 ms/30720. $N_{TA}$ is configured by the base station. For another example, the offset may be TA/2+$N_{TA\ offset}$×Ts, where a value of $N_{TA\ offset}$ is specified in a standard.

Figure 12:
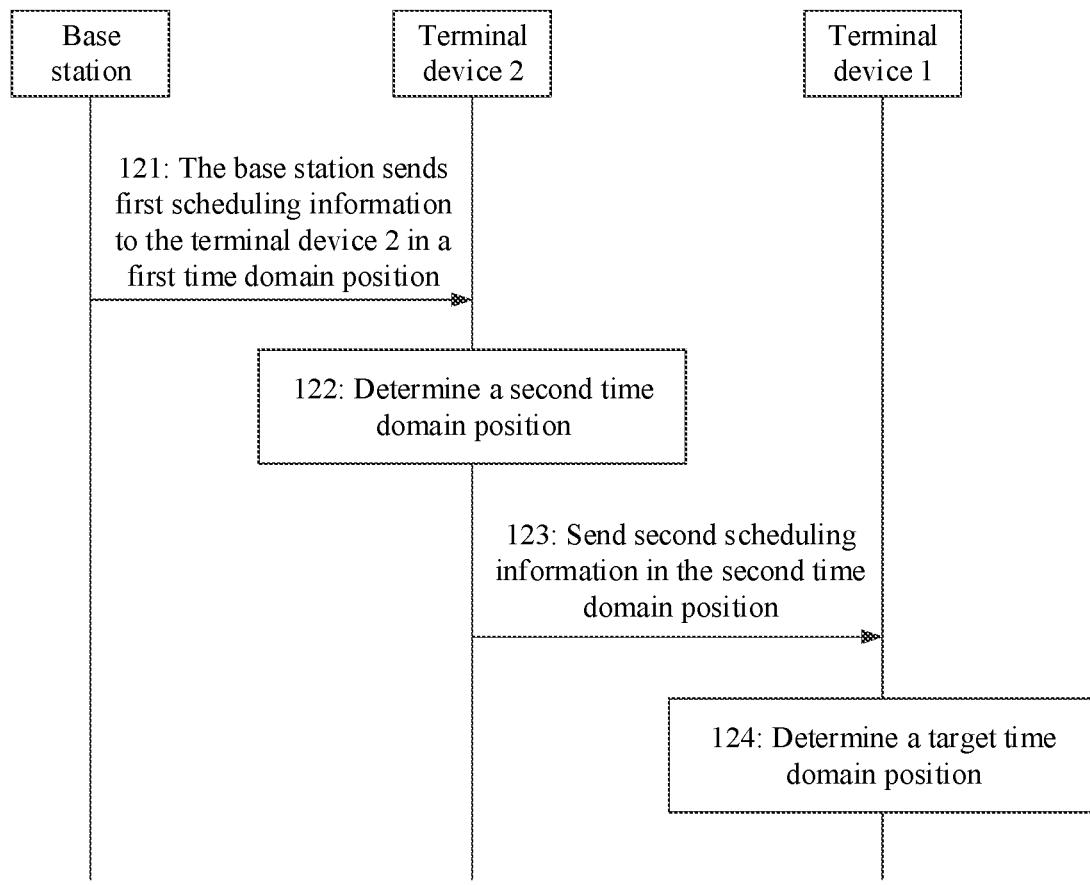
FIG. 12 is a flowchart of a time domain resource indication method according to another embodiment of this application.

FIG. 12 shows a resource indication method according to another embodiment of this application. A process of the method is as follows.

Step 121: A base station sends first scheduling information to a terminal device 2 in a first time domain position.

In a specific implementation process, before sending the first scheduling information to the terminal device 2, the base station needs to determine a time domain position of a resource allocated to a terminal device 1. A first interval and a second interval are preset on the base station, the terminal device 1, and the terminal device 2, the first interval is a difference m between the first time domain position and a time domain position in which the terminal device 2 sends second scheduling information, and the second interval is a difference T2 between a target time domain position and the time domain position in which the terminal device 2 sends the second scheduling information. In this case, after receiving, before the first time domain position, a resource request sent by the terminal device 1 or a resource request forwarded by the terminal device 2, the base station may determine, based on resource usage, that a subframe (n+m+T2) may be allocated to the terminal device 1. Then, the base station determines that the first time domain position is a subframe n, and sends the first scheduling information to the terminal device 1 in the subframe n.

It should be noted that, the first interval and the second interval may have either of the two meanings in step 21, and the first interval and the second interval may be indicated in any one of the three indication manners in step 21. In this embodiment of this application, that the first interval and the second interval have the first meaning, and the first interval and the second interval are indicated in the first indication manner is used as an example for description.

A type of the first scheduling information is the same as that in step 21, for example, the DCI, and details are not described herein again.

Step 122: The terminal device 2 receives the first scheduling information and determines a second time domain position.

After the base station sends the first scheduling information to the terminal device 2 in the first time domain position, the terminal device 2 receives the first scheduling information in the first time domain position.

In this embodiment of this application, when communicating with the base station, the terminal device 2 needs to obtain timing synchronization with the base station. Therefore, after the terminal device 2 obtains timing synchronization with the base station, the base station sends the first scheduling information in the first time domain position, to be specific, the subframe n. In this way, the terminal device 2 can determine that the terminal device 2 receives the first scheduling information in the first time domain position, e.g., the subframe n.

Figure 13:
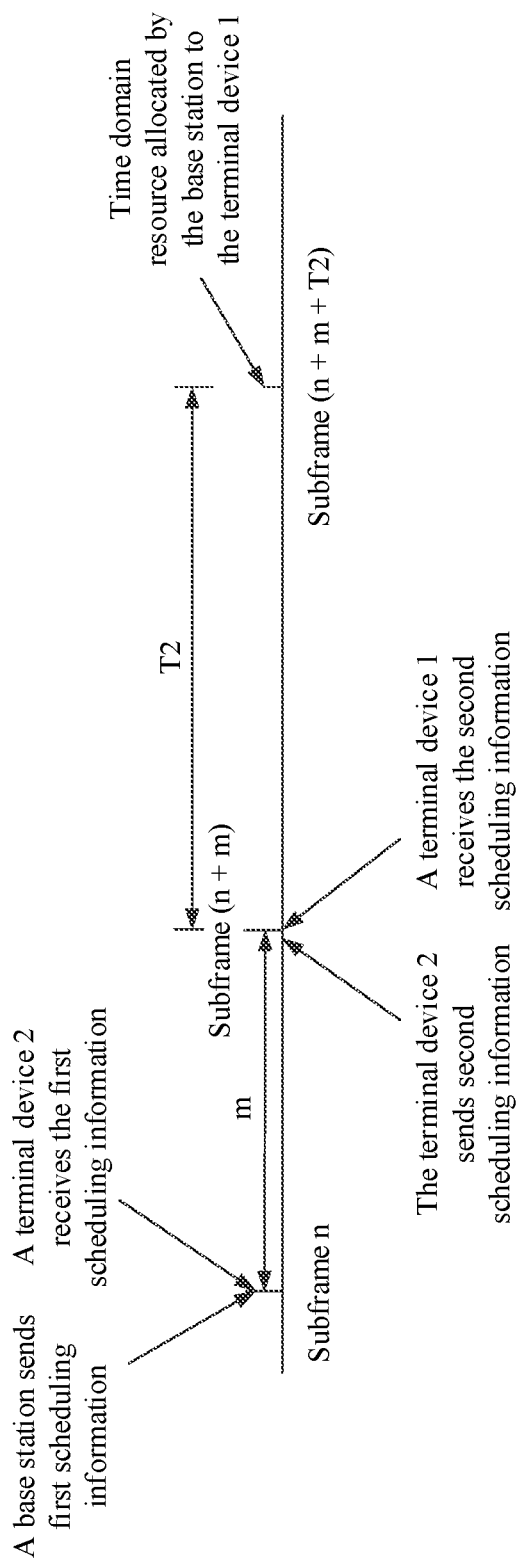
FIG. 13 is a schematic diagram of the time domain resource indication method shown in FIG. 12 in the embodiment of this application.

After receiving the first scheduling information in the first time domain position, the terminal device 2 determines that the second time domain position is a sum of the first time domain position and the preset first interval. As shown in FIG. 13, the terminal device 2 receives the first scheduling information in the subframe n, and determines, based on the preset first interval m, that the second time domain position is a subframe (n+m).

Step 123: The terminal device 2 sends second scheduling information to the terminal device 1 in the second time domain position.

In this embodiment of this application, the second invoking information is used by the terminal device 1 to determine that the target time domain position is a sum of the second time domain position and the preset second interval. In this case, the second scheduling information does not include indication information used to indicate a time domain resource. It should be noted that, if the first scheduling information includes frequency domain position or other configuration information indicated to the terminal device 1, the second scheduling information may also include the frequency domain position or the other configuration information indicated in the first scheduling information. A type of the second scheduling information is the same as that in step 22, for example, may be the SCI, and details are not described herein again.

Optionally, when a timing for sending the second scheduling information by the terminal device 2 is not synchronized with a timing for receiving the first scheduling information by the terminal device 2, a subframe corresponding to the second time domain position is the $1^{st}$ subframe whose starting time is not earlier than {starting time of the subframe n+first interval×time-domain length of a subframe−offset}. For example, the offset may be TA/2, TA is a timing advance of the terminal device 1, TA=$N_{TA}$×Ts, and Ts is a basic time unit in a frame structure and may be understood as a sampling time interval, where a value of Ts is specified in a standard, for example, Ts=1 ms/30720. $N_{TA}$ is configured by the base station. For another example, the offset may be TA/2+$N_{TA\ offset}$×Ts, where a value of $N_{TA\ offset}$ is specified in a standard.

Step 124: The terminal device 1 receives the second scheduling information and determines the target time domain position.

After the terminal device 2 sends the second scheduling information to the terminal device 1 in the second time domain position, the terminal device 1 receives the second scheduling information in the second time domain position.

In this embodiment of this application, when communicating with the terminal device 2, the terminal device 1 needs to obtain timing synchronization with the terminal device 2. Therefore, after the terminal device 1 obtains timing synchronization with the terminal device 2, the terminal device 2 sends the second scheduling information in the second time domain position, to be specific, the subframe (n+m). In this way, the terminal device 1 can determine that the terminal device 1 receives the second scheduling information in the second time domain position, to be specific, the subframe (n+m).

After receiving the second scheduling information in the second time domain position, the terminal device 1 determines that the target time domain position is the sum of the second time domain position and the preset second interval. Referring to FIG. 13, after receiving the second scheduling information in the subframe (n+m), the terminal device 1 determines, based on a value T2 of the preset second interval, that the target time domain position is a subframe (n+m+T2), to determine, based on the target time domain position, a time domain resource used by the terminal device 1 to send and/or receive data, and complete a process of indicating, by the base station to the terminal device 2 by using the terminal device 1, a time domain resource allocated to the terminal device 1.

It should be noted that, a manner of determining, by the terminal device 1 based on the target time domain position, the time domain resource used to send and/or receive the data may be determined in the four cases in step 21 of the target time domain position and the time domain position of the resource. Details are not described herein again.

Optionally, when a timing for sending or receiving the data by the terminal device 1 is not synchronized with a timing for receiving the second scheduling information by the terminal device 1, a subframe corresponding to the target time domain position is the $1^{st}$ subframe whose starting time is not earlier than {starting time of the subframe (n+m)+second interval×time-domain length of a subframe−offset}. For example, the offset may be TA/2, TA is a timing advance of the terminal device 1, TA=$N_{TA}$×Ts, and Ts is a basic time unit in a frame structure and may be understood as a sampling time interval, where a value of Ts is specified in a standard, for example, Ts=1 ms/30720. $N_{TA}$ is configured by the base station. For another example, the offset may be TA/2+$N_{TA\ offset}$×Ts, where a value of $N_{TA\ offset}$ is specified in a standard.

Figure 14:
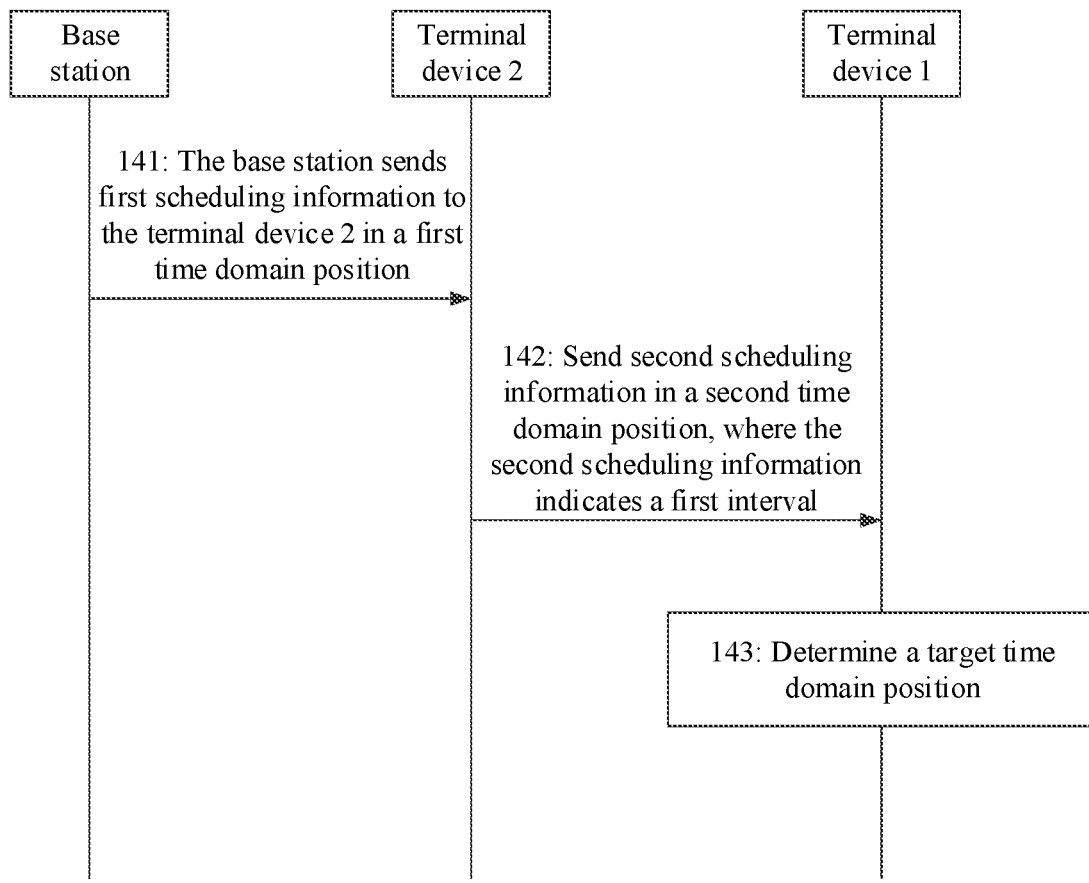
FIG. 14 is a flowchart of a time domain resource indication method according to another embodiment of this application.

FIG. 14 shows a resource indication method according to another embodiment of this application. A process of the method is as follows.

Step 141: A base station sends first scheduling information to a terminal device 2 in a first time domain position.

In an example implementation process, before sending the first scheduling information to the terminal device 2, the base station needs to determine a time domain position of a resource allocated to a terminal device 1. A third interval is preset on the base station, the terminal device 1, and the terminal device 2, and the third interval is a difference T1 between a target time domain position and the first time domain position. In this case, after receiving, before the first time domain position, a resource request sent by the terminal device 1 or a resource request forwarded by the terminal device 2, the base station may determine, based on resource usage, that a subframe (n+T1) may be allocated to the terminal device 1. Then, the base station determines that the first time domain position is a subframe n, and sends the first scheduling information to the terminal device 1 in the subframe n.

In this embodiment of this application, the base station may send the first scheduling information in either of the following two manners.

In a first sending manner, the first scheduling information does not include indication information used to indicate a time domain resource. The first scheduling information is used by the terminal device 1 to determine that the target time domain position is a sum of the first time domain position and the preset third interval. It should be noted that, the first scheduling information further includes frequency domain position or other configuration information indicated to the terminal device 1. This is not limited herein. A type of the first scheduling information is the same as that in step 21, for example, the DCI, and details are not described herein again.

In a second sending manner, the first scheduling information includes second indication information, and the second indication information is used to indicate a first interval. The first interval is a difference between the first time domain position and a time domain position in which the terminal device 2 sends second scheduling information. For example, the first interval is m subframes.

It should be noted that, the first interval, a second interval, and the third interval may have any one of the four meanings in step 21, and the first interval, the second interval, and the third interval may be indicated in any one of the three indication manners in step 21. In this embodiment of this application, that the first interval, the second interval, and the third interval have the first meaning, and the first interval, the second interval, and the third interval are indicated in the first indication manner is used as an example for description.

A type of the first scheduling information is the same as that in step 21, for example, the DCI, and details are not described herein again.

Step 142: The terminal device 2 sends the second scheduling information to the terminal device 1 in a second time domain position, where the second scheduling information includes first indication information, the first indication information is used to indicate the first interval, the second scheduling information is used by the terminal device 1 to determine that the target time domain position is a sum of the second time domain position and the second interval, and the second interval is a difference between the preset third interval and the first interval indicated in the first indication information.

After the base station sends the first scheduling information to the terminal device 2 in the first time domain position, the terminal device 2 receives the first scheduling information in the first time domain position.

In this embodiment of this application, when communicating with the base station, the terminal device 2 needs to obtain timing synchronization with the base station. Therefore, after the terminal device 2 obtains timing synchronization with the base station, the base station sends the first scheduling information in the first time domain position, to be specific, the subframe n. In this way, the terminal device 2 can determine that the terminal device 2 receives the first scheduling information in the first time domain position, to be specific, the subframe n.

Based on different manners in which the base station sends the first scheduling information, after the terminal device 2 receives the first scheduling information in the first time domain position, there are also two different processing manners.

For a first sending manner, after receiving the first scheduling information, the terminal device 2 selects a time domain position after the first time domain position, to send the second scheduling information to the terminal device 1. For example, the terminal device 2 sends the second scheduling information to the terminal device 1 in a selected subframe (n+m), where m is a value greater than 0 and less than or equal to the third interval T1.

Figure 15:
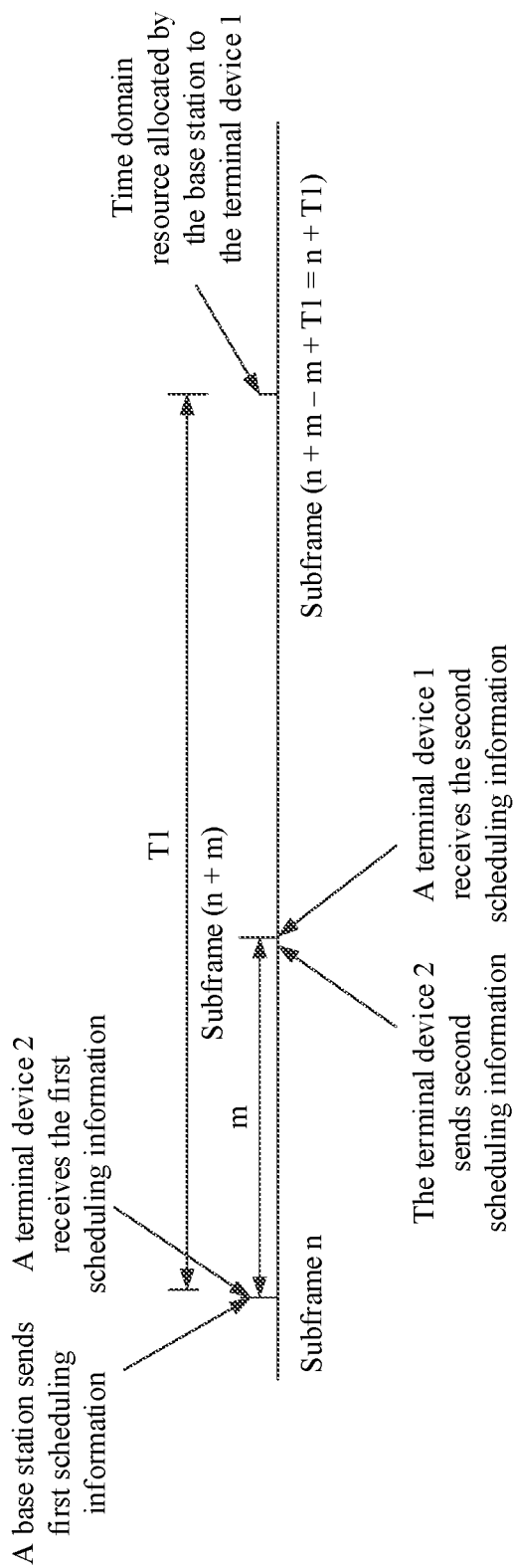
FIG. 15 is a schematic diagram of the time domain resource indication method shown in FIG. 14 in the embodiment of this application.

For a second sending manner, after receiving the first scheduling information, the terminal device 2 determines, based on the first interval indicated in the first scheduling information, that the second time domain position is a sum of the first time domain position and the first interval, and then sends the second scheduling information to the terminal device 1 in the determined second time domain position. As shown in FIG. 15, after receiving the first scheduling information in the subframe n, the terminal device 2 determines that the second time domain position is the subframe (n+m), and sends the second scheduling information to the terminal device 1 in the subframe (n+m).

A type of the second scheduling information is the same as that in step 22, for example, the SCI, and details are not described herein again.

Optionally, when a timing for sending the second scheduling information by the terminal device 2 is not synchronized with a timing for receiving the first scheduling information by the terminal device 2, a subframe corresponding to the second time domain position is the $1^{st}$ subframe whose starting time is not earlier than {starting time of the subframe n+first interval×time-domain length of a subframe−offset}. For example, the offset may be TA/2, TA is a timing advance of the terminal device 1, TA=$N_{TA}$×Ts, and Ts is a basic time unit in a frame structure and may be understood as a sampling time interval, where a value of Ts is specified in a standard, for example, Ts=1 ms/30720. $N_{TA}$ is configured by the base station. For another example, the offset may be TA/2+$N_{TA\ offset}$×Ts, where a value of $N_{TA\ offset}$ is specified in a standard.

Step 143: The terminal device 1 receives the second scheduling information, and determines the target time domain position.

After the terminal device 2 sends the second scheduling information to the terminal device 1 in the second time domain position, the terminal device 1 receives the second scheduling information in the second time domain position.

In this embodiment of this application, when communicating with the terminal device 2, the terminal device 1 needs to obtain timing synchronization with the terminal device 2. Therefore, after the terminal device 1 obtains timing synchronization with the terminal device 2, the terminal device 2 sends the second scheduling information in the second time domain position, to be specific, the subframe (n+m). In this way, the terminal device 1 can determine that the terminal device 1 receives the second scheduling information in the second time domain position, to be specific, the subframe (n+m).

After receiving the second scheduling information in the second time domain position, the terminal device 1 determines that the target time domain resource position is the sum of the second time domain position and the second interval. The second interval is a difference between the preset third interval and the first interval indicated in the first indication information. Referring to FIG. 15, after receiving the second scheduling information in the subframe (n+m), the terminal device 1 determines, based on the preset third interval T1, that the target time domain position is a subframe (n+m+(T1−m)=n+T1, to determine, based on the target time domain position, a time domain resource used by the terminal device 1 to send and/or receive data, and complete a process of indicating, by the base station to the terminal device 2 by using the terminal device 1, a time domain resource allocated to the terminal device 1.

It should be noted that, a manner of determining, by the terminal device 1 based on the target time domain position, the time domain resource used to send and/or receive the data may be determined in the four cases in step 21 of the target time domain position and the time domain position of the resource. Details are not described herein again.

Optionally, when a timing for sending or receiving the data by the terminal device 1 is not synchronized with a timing for receiving the second scheduling information by the terminal device 1, a subframe corresponding to the target time domain position is the 1$^{st}$ subframe whose starting time is not earlier than {starting time of the subframe (n+m)+second interval×time-domain length of a subframe−offset}. For example, the offset may be TA/2, TA is a timing advance of the terminal device 1, TA=$N_{TA}$×Ts, and Ts is a basic time unit in a frame structure and may be understood as a sampling time interval, where a value of Ts is specified in a standard, for example, Ts=1 ms/30720. $N_{TA}$ is configured by the base station. For another example, the offset may be TA/2+$N_{TA\ offset}$×Ts, where a value of $N_{TA\ offset}$ is specified in a standard.

In the foregoing technical solutions, content indicated in the first scheduling information and the second scheduling information, a time point for sending the scheduling information, and intervals preset on the network device, the first device, and the second device are properly designed, so that after receiving the scheduling information sent by the first device, the second device can determine, based on the scheduling information, the time domain resource allocated by the network device to the second device. This can implement a process of forwarding, by the first device, signaling for scheduling the second device by the network device.

In the foregoing embodiments provided in this application, the resource indication methods provided in the embodiments of this application are separately described from perspectives of each network element and interaction between all network elements. It can be understood that, to implement the foregoing functions, the network elements such the terminal device 1, the terminal device 2, and the base station include corresponding hardware structures and/or software modules for performing the functions. A person skilled in the art should be easily aware that, in combination with the examples described in the embodiments disclosed in this specification, units and algorithm steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 16:
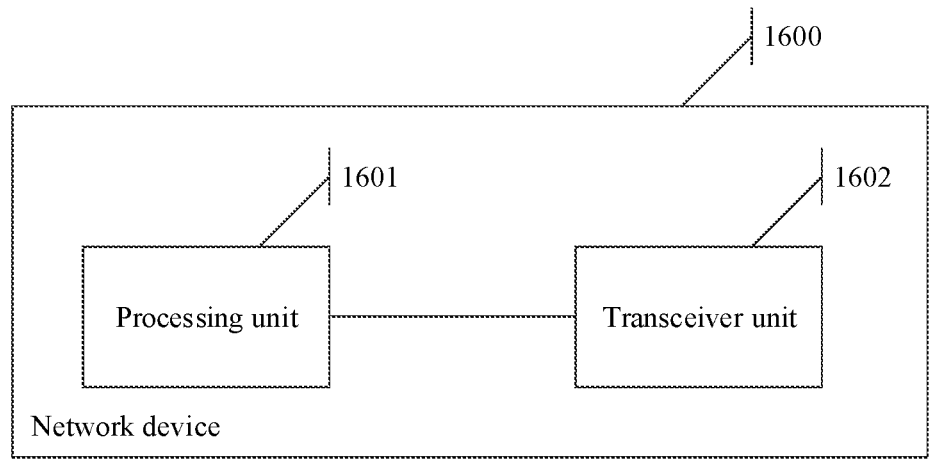
FIG. 16 is a structural block diagram of a network device according to an embodiment of this application.

FIG. 16 is a possible schematic structural diagram of a network device 1600. The network device 1600 may be the base station shown in FIG. 1. The network device 1600 may implement a function of the base station described above. The network device 1600 may include a processing unit 1601 and a transceiver unit 1602. The processing unit 1601 and the transceiver unit 1602 may be configured to perform step 21 in the embodiment shown in FIG. 2, step 41 in the embodiment shown in FIG. 4, step 61 in the embodiment shown in FIG. 6, step 81 in the embodiment shown in FIG. 8, step 101 in the embodiment shown in FIG. 10, step 121 in the embodiment shown in FIG. 12, and step 141 in the embodiment shown in FIG. 14, and/or configured to support another process in the technology described in this specification. All related content of the steps in the foregoing method embodiments may be cited in function descriptions of corresponding function modules. Details are not described herein again.

Figure 17:
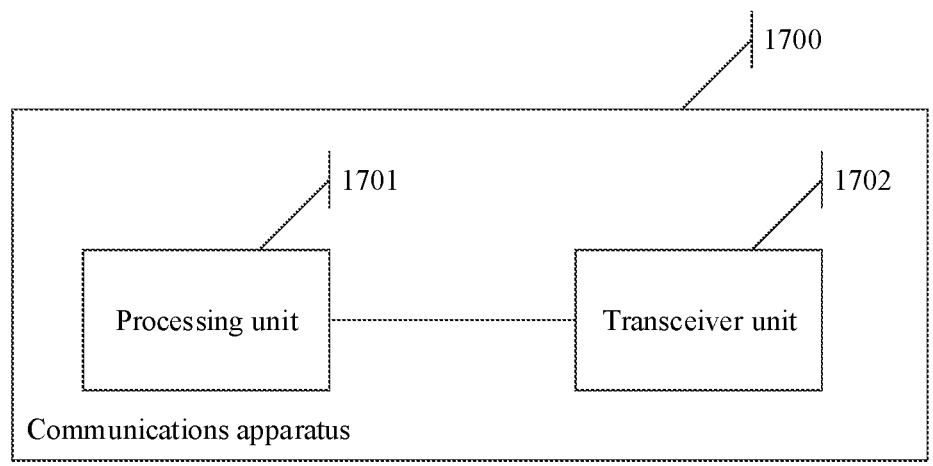
FIG. 17 is a structural block diagram of a communications apparatus according to an embodiment of this application.

FIG. 17 is a possible schematic structural diagram of a communications apparatus 1700. The communications apparatus 1700 may be the terminal device 2 shown in FIG. 1. The communications apparatus 1700 may implement a function of the terminal device 2 described above. The network device 1700 may include a processing unit 1701 and a transceiver unit 1702. The processing unit 1701 may be configured to perform step 22 in the embodiment shown in FIG. 2, step 42 in the embodiment shown in FIG. 4, step 62 in the embodiment shown in FIG. 6, step 82 in the embodiment shown in FIG. 8, step 102 in the embodiment shown in FIG. 10, step 122 in the embodiment shown in FIG. 12, and step 142 in the embodiment shown in FIG. 14, and/or configured to support another process in the technology described in this specification. The transceiver unit 1702 may be configured to perform step 22 in the embodiment shown in FIG. 2, step 43 in the embodiment shown in FIG. 4, step 63 in the embodiment shown in FIG. 6, step 83 in the embodiment shown in FIG. 8, step 103 in the embodiment shown in FIG. 10, step 123 in the embodiment shown in FIG. 12, and step 142 in the embodiment shown in FIG. 14, and/or configured to support another process in the technology described in this specification. All related content of the steps in the foregoing method embodiments may be cited in function descriptions of corresponding function modules. Details are not described herein again.

In the embodiments of the present invention, the network device 1600 and the communications apparatus 1700 are presented in a form in which each function module corresponding to each function is obtained by division, or may be presented in a form in which each function module is divided in an integrated manner. The "module" herein may be an application-specific integrated circuit (ASIC), a processor and a memory for executing one or more software or firmware programs, an integrated logic circuit, and/or another component that can provide the foregoing functions.

Figure 18:
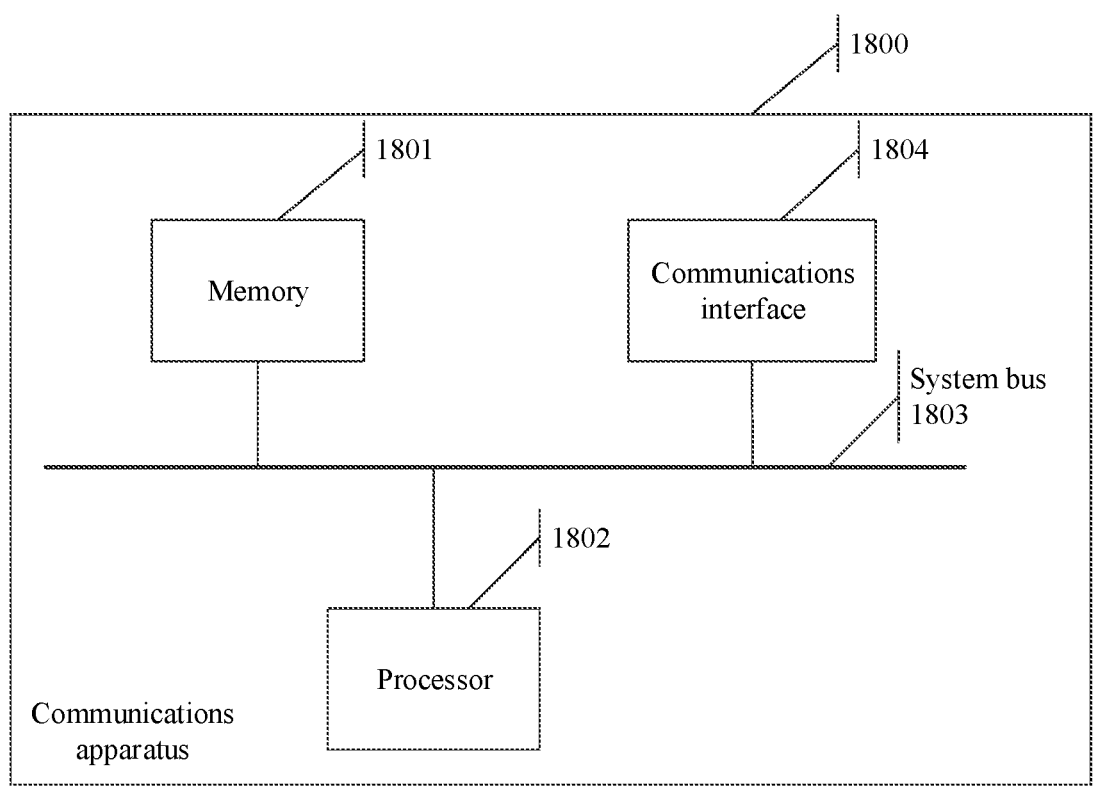
FIG. 18 is a structural block diagram of another communications apparatus according to an embodiment of this application.

In a simple embodiment, a person skilled in the art may figure out that the network device 1600 and the communications apparatus 1700 may further be implemented by using a structure shown in FIG. 18.

As shown in FIG. 18, a communications apparatus 1800 may include a memory 1801, a processor 1802, a system bus 1803, and a communications interface 1804. The processor 1802, the memory 1801, and the communications interface 1804 are connected by using the system bus 1803. The memory 1801 is configured to store a computer execution instruction. When the communications apparatus 1800 runs, the processor 1802 executes the computer execution instruction stored in the memory 1801, so that the communications apparatus 1800 performs the resource indication methods provided in the embodiments shown in FIG. 2, FIG. 4, FIG. 6, FIG. 8, FIG. 10, FIG. 12, and FIG. 14. For the specific resource indication methods, refer to the foregoing descriptions and related descriptions in the accompanying drawings. Details are not described herein again. The communications interface 1804 may be a transceiver, or an independent receiver and transmitter.

In an example, the transceiver unit 1602 may correspond to the communications interface 1804 in FIG. 18. The processing unit 1601 may be built in or independent of the memory 1801 in the communications apparatus 1800 in a hardware/software form.

In an example, the transceiver unit 1702 may correspond to the communications interface 1804 in FIG. 18. The processing unit 1701 may be built in or independent of the memory 1801 in the communications apparatus 1800 in a hardware/software form.

Optionally, the memory 1801 may include a volatile memory, for example, a RAM. The memory 1801 may also include a nonvolatile memory, such as a flash memory, an HDD, or an SSD. The memory 1801 may alternatively include a combination of the foregoing types of memories.

Optionally, the processor 1802 may be a CPU, an NP, or a combination of a CPU and an NP. The processor 1202 may further include a hardware chip. The hardware chip may be an ASIC, a PLD, or a combination thereof. The PLD may be a CPLD, an FPGA, a GAL, or any combination thereof.

Optionally, the system bus 1803 may be a PCI bus, an EIS bus, or the like. The bus may be classified into an address bus, a data bus, a control bus, and the like. For ease of representation, only one bold line is used to represent the system bus in FIG. 18, but this does not mean that there is only one bus or only one type of bus. Certainly, the system bus 1803 may be replaced with another connection structure, for example, a star structure. This is not limited in this embodiment of this application.

Optionally, the apparatus 1800 may be a field-programmable gate array (FPGA), an application-specific integrated circuit (ASIC), a system on chip (SoC), a central processing unit (CPU), a network processor (NP), a digital signal processing circuit (DSP), a micro controller unit (MCU), a programmable logic device (PLD), or another integrated chip.

The communications apparatus and the network device provided in this application may be a chip system, and the chip system may include at least one chip, and may further include another discrete device. The chip system may be disposed in the communications apparatus or the network device, and supports the communications apparatus or the network device to complete the resource indication methods provided in the embodiments of this application.

An embodiment of this application provides a computer storage medium. The computer storage medium stores an instruction, and when the instruction is run on a computer, the computer is enabled to perform the foregoing resource indication methods.

An embodiment of this application provides a computer program product. The computer program product includes an instruction, and when the instruction is run on a computer, the computer is enabled to perform the foregoing resource indication methods.

All or some of the foregoing embodiments may be implemented by using software, hardware, firmware, or any combination thereof. When the software is used to implement the embodiments, the embodiments may be implemented completely or partially in a form of a computer program product. The computer program product includes one or more computer instructions. When the computer program instruction is loaded and executed on a computer, some or all of the procedures or functions according to the embodiments of this application are generated. The computer may be a general-purpose computer, a special-purpose computer, a computer network, or another programmable apparatus. The computer instruction may be stored in a computer-readable storage medium, or may be transmitted from a computer-readable storage medium to another readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium, transitory or non-transitory, accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A resource indication method, comprising:
receiving, by a first device in a first time domain position, first scheduling information sent by a network device, wherein the first scheduling information comprises first indication information, and the first indication information is used to indicate a first interval; and
sending, by the first device, second scheduling information to a second device in a second time domain position, wherein the second scheduling information comprises second indication information, the second indication information is used to indicate a second interval, the second interval is a difference between the first interval and a third interval, the third interval is a difference between the second time domain position and the first time domain position, the second scheduling information is used by the second device to determine that a target time domain position is a sum of the second time domain position and the second interval, and the target time domain position is used by the second device to determine a time domain resource used to send and/or receive data.

2. The method according to claim 1, wherein the third interval is predefined, or is configured by the network device, or is preconfigured; and
before the sending, by the first device, second scheduling information to a second device in a second time domain position, the method further comprises:
determining, by the first device, that the second time domain position is a sum of the first time domain position and the third interval.

3. A communications apparatus, comprising a processor and a transceiver, wherein
the transceiver is controlled by the processor to receive, in a first time domain position, first scheduling information sent by a network device; and
the transceiver is controlled by the processor to send second scheduling information to a second device in a second time domain position, wherein the second scheduling information comprises first indication information, the first indication information is used to indicate a first interval, the first interval is a difference between the second time domain position and the first time domain position, the second scheduling information is used by the second device to determine that a target time domain position is a sum of the second time domain position and a second interval, the target time domain position is used by the second device to determine a time domain resource used to send and/or receive data, the second interval is a difference between a third interval and the first interval, and the third interval is predefined, or is configured by the network device, or is preconfigured.

4. The communications apparatus according to claim 3, wherein the first scheduling information comprises second indication information, and the second indication information is used to indicate the first interval; and
the processor is further configured to:
determine that the second time domain position is a sum of the first time domain position and the first interval.

* * * * *

UNITED STATES PATENT AND TRADEMARK OFFICE
CERTIFICATE OF CORRECTION

| | | |
|---|---|---|
| PATENT NO. | : 11,197,304 B2 | Page 1 of 1 |
| APPLICATION NO. | : 16/646275 | |
| DATED | : December 7, 2021 | |
| INVENTOR(S) | : Yu Cai et al. | |

It is certified that error appears in the above-identified patent and that said Letters Patent is hereby corrected as shown below:

On the Title Page

In item (56), in Column 2, under "Other Publications", Line 1, delete ""Sideiink" and insert -- "Sidelink --.

Signed and Sealed this
Fifth Day of April, 2022

Drew Hirshfeld
*Performing the Functions and Duties of the
Under Secretary of Commerce for Intellectual Property and
Director of the United States Patent and Trademark Office*